(12) United States Patent
Kim et al.

(10) Patent No.: US 11,868,524 B2
(45) Date of Patent: Jan. 9, 2024

(54) AUGMENTED REALITY DEVICE AND OPERATING METHOD THEREOF

(71) Applicant: SAMSUNG ELECTRONICS CO., LTD., Suwon-si (KR)

(72) Inventors: Kimin Kim, Suwon-si (KR); Dowan Kim, Suwon-si (KR); Bonkon Koo, Suwon-si (KR); Taehwa Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/561,329

(22) Filed: Dec. 23, 2021

(65) Prior Publication Data

US 2022/0197377 A1   Jun. 23, 2022

(30) Foreign Application Priority Data

Dec. 23, 2020   (KR) .................. 10-2020-0182422

(51) Int. Cl.
*G06F 3/01*   (2006.01)
*G06V 40/18*   (2022.01)
*G09G 3/20*   (2006.01)

(52) U.S. Cl.
CPC .............. *G06F 3/013* (2013.01); *G06V 40/18* (2022.01); *G09G 3/2092* (2013.01); *G09G 2320/0626* (2013.01); *G09G 2330/021* (2013.01); *G09G 2354/00* (2013.01)

(58) Field of Classification Search
CPC ............................. G06F 3/013; G06T 19/006
See application file for complete search history.

(56) References Cited

U.S. PATENT DOCUMENTS

| 8,752,963 | B2 | 6/2014 | McCulloch et al. |
| 9,696,548 | B2 | 7/2017 | Ohashi |
| 10,714,047 | B2 | 7/2020 | Kim et al. |
| 2002/0044152 | A1 | 4/2002 | Abbott, III et al. |
| 2011/0181541 | A1 | 7/2011 | Kuo |

(Continued)

FOREIGN PATENT DOCUMENTS

| JP | 2017-97098 A | 6/2017 |
| JP | 6501389 A | 3/2019 |

(Continued)

OTHER PUBLICATIONS

Communication (PCT/ISA/210 & PCT/ISA/237) dated Mar. 25, 2022 issued by the International Searching Authority in International Application No. PCT/KR2021/019421.

(Continued)

*Primary Examiner* — Shivang I Patel
(74) *Attorney, Agent, or Firm* — Sughrue Mion, PLLC

(57) ABSTRACT

An augmented reality (AR) device is provided. The AR device includes a display module configured to output light of a virtual image, a waveguide configured to transmit the output light of the virtual image to an eye of a user and to pass external light therethrough, a gaze tracking sensor configured to obtain information on the eye of the user, the information including a pupil size, a memory storing instructions, and a processor configured to execute the instructions to control the display module to adjust a brightness of the light of the virtual image based on the pupil size.

20 Claims, 21 Drawing Sheets

(56) References Cited

U.S. PATENT DOCUMENTS

| | | |
|---|---|---|
| 2015/0003819 A1 | 1/2015 | Ackerman et al. |
| 2016/0018658 A1* | 1/2016 | Machida ............ G02B 27/0176 |
| | | 345/207 |
| 2016/0267875 A1 | 9/2016 | Weindorf et al. |
| 2017/0277258 A1* | 9/2017 | Ma .......................... G09G 5/10 |
| 2018/0239425 A1 | 8/2018 | Jang |
| 2019/0086674 A1* | 3/2019 | Sinay ................... G02B 27/283 |

FOREIGN PATENT DOCUMENTS

| | | |
|---|---|---|
| JP | 2019-118004 A | 7/2019 |
| KR | 10-2015-0057183 A | 5/2015 |
| KR | 10-1885473 B1 | 8/2018 |
| KR | 10-2020-0098908 A | 8/2020 |
| KR | 10-2153599 B1 | 9/2020 |
| WO | 2020/242085 A1 | 12/2020 |

OTHER PUBLICATIONS

"How do Tobii Eye Trackers Work?", downloaded Dec. 20, 2021, copyright 2021, https://www.tobiipro.com/ko/learn-and-support/learn/eyetracking-essentials/how-do-tobii-eye-trackers-work/, pp. 1-6 (6 pages total).

* cited by examiner

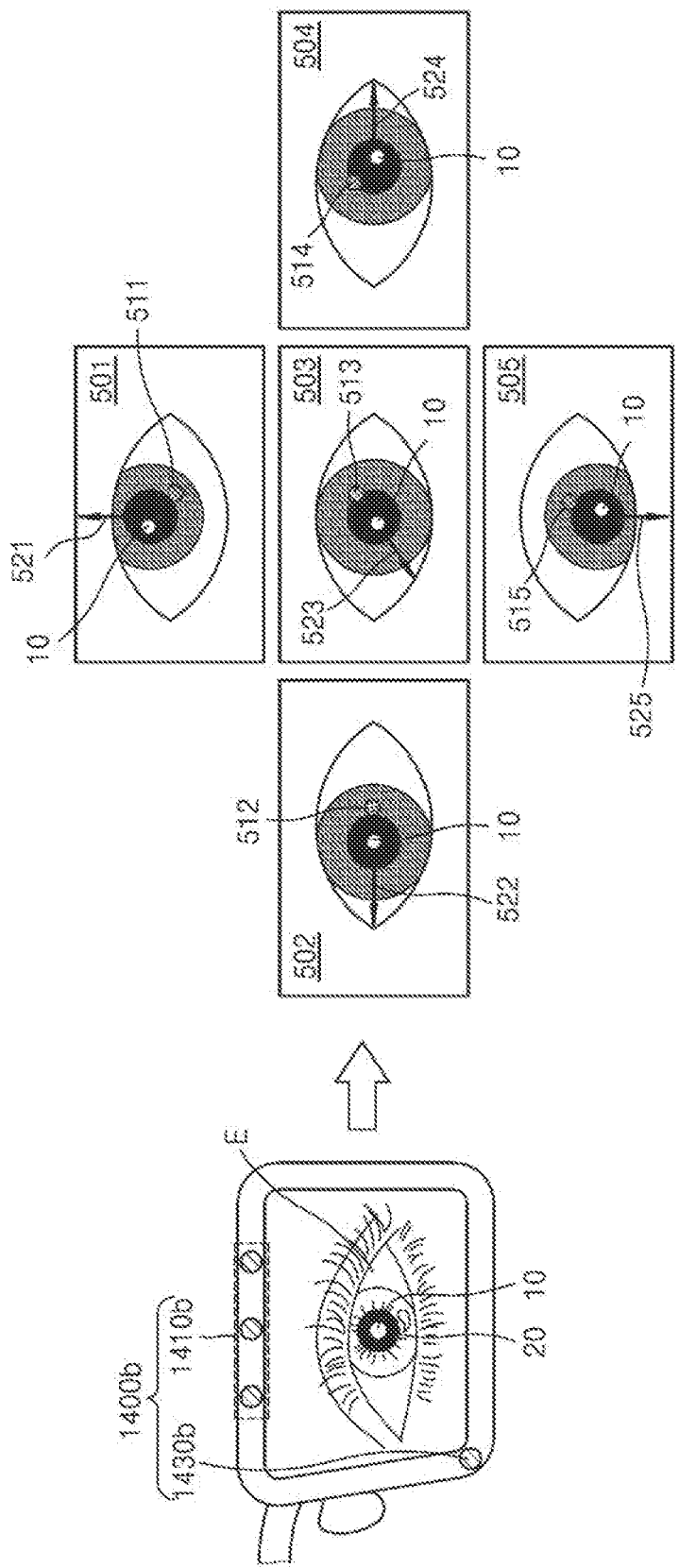

AUGMENTED REALITY DEVICE AND OPERATING METHOD THEREOF

CROSS-REFERENCE TO RELATED APPLICATION

This application is based on and claims priority under 35 U.S.C. § 119 to Korean Patent Application No. 10-2020-0182422, filed on Dec. 23, 2020, in the Korean Intellectual Property Office, the disclosure of which is incorporated by reference herein in its entirety.

BACKGROUND

1. Field

The disclosure relates to an augmented reality (AR) device configured to virtually display a virtual image on a real world object, and more particularly, to an AR device configured to automatically change brightness of light constituting a virtual image according to a pupil size of a user's eye, and an operating method the AR device.

2. Description of the Related Art

Augmented reality (AR) is a technology that may overlay a virtual image on a physical environment space of the real world or a real world object, and that may display the virtual image together with the real world object, and an AR device (e.g., smart glasses) using AR technology is efficiently used in everyday life, for example, for information search, direction guidance, and camera photographing. Smart glasses, as an example of an AR device, are worn as a fashion item and mainly used for outdoor activities.

The AR device generally enables a user to view a scene through a see-through (e.g., transparent) display arranged close to his or her eyes while the user is wearing the AR device. In this case, a scene includes at least one real world object in a physical environment or a space that the user views directly with his or her eyes. The AR device transmits a virtual image to the user's eyes through the see-through display, and the user can simultaneously view the real world object and the virtual image on the see-through display.

A technology for adjusting brightness of light constituting a virtual image according to the illuminance of a surrounding environment is required to increase the visibility of the virtual image displayed on the AR device. When the brightness of the light of the virtual image is extremely high compared to the illuminance of the surrounding environment, the visibility of the virtual image may decrease, and glare or eye fatigue may occur. Also, even when the brightness of the light constituting the virtual image is increased at high illuminance for a long time, power consumption of the AR device increases, and overheating occurs.

SUMMARY

Provided is an augmented reality (AR) device that automatically changes brightness of light constituting a virtual image projected through a waveguide based on a pupil size of a user's eye, and an operating method thereof. Also provided is an AR device that automatically changes a light transmittance of light incident on the AR device from the outside based on a pupil size of a user, and an operating method thereof.

Additional aspects will be set forth in part in the description which follows and, in part, will be apparent from the description, or may be learned by practice of the presented embodiments.

In accordance with an aspect of the disclosure, an AR device may include a display module configured to output light of a virtual image, a waveguide transmitting the output light of the virtual image to an eye of a user and passing external light therethrough, a gaze tracking sensor configured to obtain information on the eye of the user, the information including a pupil size, a memory storing instructions, and a processor configured to execute the instructions to control the display module to adjust a brightness of the light of the virtual image based on the pupil size.

The processor may be further configured to execute the instructions to adjust the brightness of the light of the virtual image by an amount that is inversely proportional to the pupil size.

The processor may be further configured to execute the instructions to detect an iris and a pupil from an image of the eye of the user captured by the gaze tracking sensor, calculate a pupil size ratio by performing an operation of dividing a size of a diameter of the detected pupil by a size of a diameter of the iris, compare the calculated pupil size ratio with a reference pupil size ratio, and adjust the brightness of the light of the virtual image based on a result of the comparison of the calculated pupil size ratio with the reference pupil size ratio.

The reference pupil size ratio may be determined as an average value of pupil sizes based on user comfort according to data previously obtained.

The reference pupil size ratio may be determined based on at least one of an age of the user, a brightness preference for the virtual image according to identification information, a type of an application being executed on the AR device, or information on a calibration performed by the user.

The processor maybe further configured to execute the instructions to obtain, by using the gaze tracking sensor, three-dimensional position coordinate information on a gaze point at which a gaze direction of a left eye and a gaze direction of a right eye converge, obtain distance information on a distance between the gaze point and the virtual image by measuring a distance between the three-dimensional position coordinate information on the gaze point and a region in which the virtual image is displayed, and change the brightness of the light of the virtual image based on the pupil size and the distance information on the distance between the gaze point and the virtual image.

The gaze tracking sensor may include a first gaze tracking camera configured to track the gaze direction of the left eye by capturing an image of the left eye of the user, and a second gaze tracking camera configured to track the gaze direction of the right eye by capturing an image of the right eye of the user. The processor may be further configured to obtain a first gaze vector indicating the gaze direction of the left eye by using the first gaze tracking camera, obtain a second gaze vector indicating the gaze direction of the right eye by using the second gaze tracking camera, detect a gaze point at which the first gaze vector and the second gaze vector converge according to binocular disparity, and obtain three-dimensional position coordinate information on the detected gaze point.

The processor may be further configured to execute the instructions to adjust the brightness of the light of the virtual image by an amount that is inversely proportional to the distance between the gaze point and the virtual image.

The AR device may further include a light transmission unit configured to adjust a light transmittance of the external light, and a power supply configured to supply power to the light transmission unit. The processor may be further configured to execute the instructions to determine the light transmittance of the external light based on the pupil size, determine a supply voltage corresponding to the light transmittance, and adjust the light transmittance of the external light by controlling the power supply to supply the determined supply voltage to the light transmission unit.

The processor may be further configured to execute the instructions to obtain, by using the gaze tracking sensor, three-dimensional position coordinate information on a gaze point at which a gaze direction of a left eye and a gaze direction of a right eye converge, obtain distance information on a distance between the gaze point and the virtual image by measuring a distance between the three-dimensional position coordinate information on the gaze point and a region in which the virtual image is displayed, and control the light transmission unit to adjust the light transmittance of the external light based on the pupil size and the distance information.

In accordance with an aspect of the disclosure, a method of an AR device may include obtaining information on an eye of a user by a gaze tracking sensor, the information including a pupil size, determining a brightness of light of a virtual image output to a waveguide of the AR device based on the obtained pupil size, and adjusting a brightness of a display module of the AR device based on the determined brightness of the light of the virtual image.

The determining of the brightness of the light of the virtual image may include adjusting the brightness of the light of the virtual image by an amount that is inversely proportional to the obtained pupil size.

The obtaining of the information on the eye of the user may include detecting an iris and a pupil from an image of the eye of the user captured by the gaze tracking sensor, and calculating a pupil size ratio by dividing a size of a diameter of the detected pupil by a size of a diameter of the iris. The adjusting of the brightness of the light of the virtual image may include comparing the calculated pupil size ratio with a reference pupil size ratio, adjusting the brightness of the light of the virtual image based on a result of the comparison of the calculated pupil size ratio with the reference pupil size ratio.

The reference pupil size ratio may be determined as an average value of pupil sizes based on user comfort, according to data previously obtained.

The reference pupil size ratio may be determined based on at least one of an age of the user, a brightness preference for the virtual image according to identification information, a type of an application being executed on the AR device, or information on calibration performed by the user.

The method may further include obtaining, by using the gaze tracking sensor, three-dimensional position coordinate information on a gaze point at which a gaze direction of a left eye and a gaze direction of a right eye converge, and obtaining distance information on a distance between the gaze point and the virtual image by measuring a distance between the three-dimensional position coordinate information on the gaze point and a region in which the virtual image is displayed. The adjusting of the brightness of the light of the virtual image may include adjusting the brightness of the light of the virtual image based on the pupil size and the distance information on the distance between the gaze point and the virtual image.

The obtaining of the three-dimensional position coordinate information on the gaze point may include obtaining a first gaze vector by tracking the gaze direction of the left eye by using a first gaze tracking camera, obtaining a second gaze vector by tracking the gaze direction of the right eye by using a second gaze tracking camera, detecting a gaze point at which the first gaze vector and the second gaze vector converge according to binocular disparity, and obtaining three-dimensional position coordinate information on the detected gaze point.

The determining of the brightness of the light of the virtual image may include adjusting the brightness of the light of the virtual image by an amount that is inversely proportional to the distance between the gaze point and the virtual image.

The method may further include determining a light transmittance of external light based on the obtained pupil size, determining a supply voltage corresponding to the determined light transmittance, and adjusting a light transmittance of the external light by supplying the determined supply voltage to a light transmission unit of the AR device.

In accordance with an aspect of the disclosure, a non-transitory computer-readable recording medium may be connected to at least one processor, and may store instructions that, when executed, cause the at least one processor to obtain information on an eye of a user by a gaze tracking sensor, the information comprising a pupil size, determine a brightness of light of a virtual image output to a waveguide of an augmented reality (AR) device based on the obtained pupil size, and adjust a brightness of a display module of the AR device based on the determined brightness of the light of the virtual image.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5B is a diagram of a gaze tracking sensor, which is a component of an AR device, according to an embodiment;

DETAILED DESCRIPTION

Figure 1A:
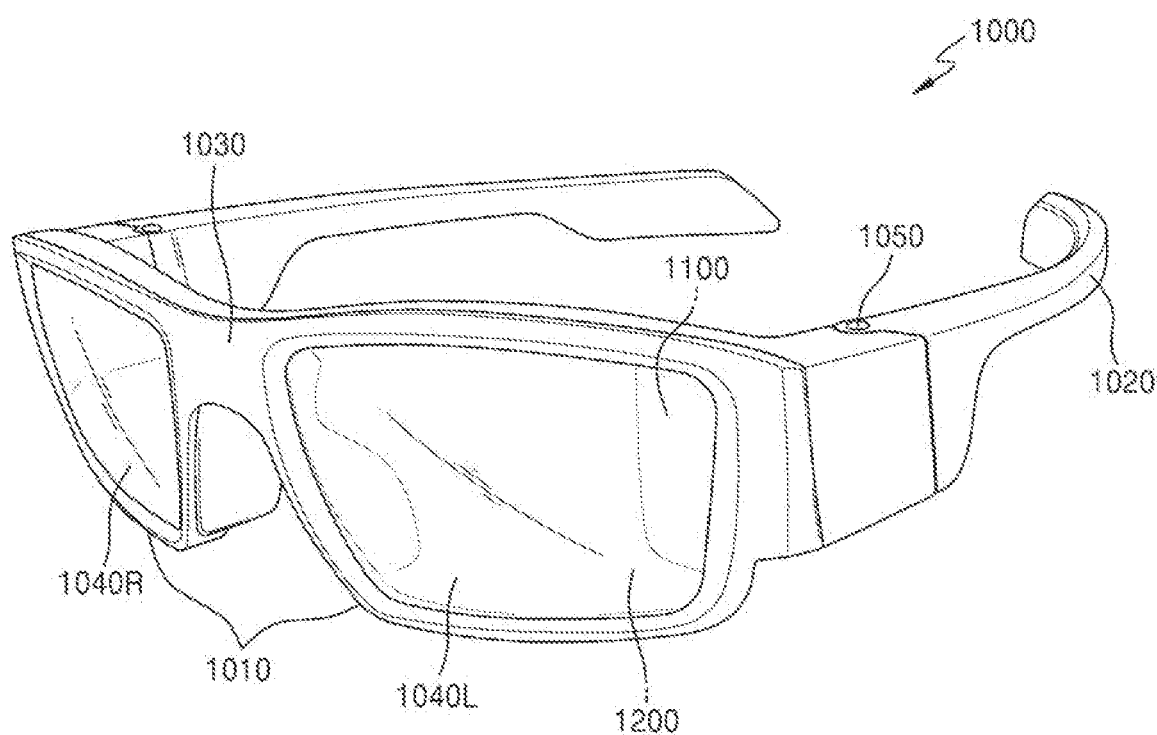
FIG. 1A is a diagram of a structure of an augmented reality (AR) device according to an embodiment.

Although terms used in embodiments of the specification are selected from among general terms popularly used at present under the consideration of functions in the disclosure, the terms may vary according to the intention of those of ordinary skill in the art, judicial precedents, or introduction of new technology. Also, in a specific case, the applicant voluntarily may select terms, and in this case, the meaning of the terms is disclosed in a corresponding description part of the disclosure. Thus, the terms used in the specification should be defined not by the simple names of the terms but by the meaning of the terms and the contents throughout the disclosure.

It is to be understood that a singular form of a noun corresponding to an item may include one or more of the things, unless the relevant context clearly indicates otherwise. All of the terms used herein including technical or scientific terms have the same meanings as those generally understood by those of ordinary skill in a technical field described in the specification.

Throughout the entirety of the disclosure, when it is assumed that a certain part includes a certain component, the term "including" or "comprising" means that a corresponding component may further include other components unless a specific meaning opposed to the corresponding component is written. The term used in the specification such as "unit" or "module" indicates a unit for processing at least one function or operation, and may be implemented in hardware, software, or in a combination of hardware and software.

Throughout the disclosure, the expression "at least one of a, b or c" indicates only a, only b, only c, both a and b, both a and c, both b and c, all of a, b, and c, or variations thereof.

An expression "configured (or set) to" used in the specification may be replaced with, for example, "suitable for," "having the capacity to," "designed to," "adapted to," "made to," or "capable of" according to a situation. The term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that may perform a corresponding operation by executing at least one software program stored in a memory.

In the disclosure, augmented reality (AR) may refer to showing a virtual image in a physical environment space of the real world or showing a real world object and a virtual image together.

Also, an AR device may be a device capable of representing AR, and may include, as well as AR glasses being in the form of glasses that a user wears generally on his/her face, a head mounted display (HMD) apparatus that is mounted on a head, an AR helmet, etc.

Moreover, a real scene may be a real world scene that a user views via an AR device and may include real world object(s).

In the disclosure, a virtual image may be an image generated through an optical engine and may include both a static image and a dynamic image. The virtual image may be shown together with a real scene and may be a virtual image representing information on a real world object in a real scene, information on an operation of an AR device, or a control menu.

In the disclosure, a virtual object may refer to a partial region of a virtual image. The virtual object may indicate information related to a real world object. The virtual object may include, for example, at least one of letters, numbers, symbols, icons, images, or animations.

In the disclosure, a focus may refer to a point at which, after a beam parallel to an optical axis of a lens (or an optical system) passes through the lens, a straight line extending from the beam meets the optical axis. A distance in the air from a principal plane of the lens (or the optical system) to a focal point is referred to as a focal distance.

In the disclosure, a depth of a virtual image may refer to a distance or a position at which a user recognizes that there is a virtual image on a space when the user views the virtual image. A three-dimensional (3D) image using binocular disparity generates a left eye virtual image and a right eye virtual image in different gaze directions. In this case, the different gaze directions may include a gaze direction viewed from the user's left eye and a gaze direction viewed from the user's right eye. Accordingly, in the 3D image using the binocular disparity, the depth of the virtual image may be a distance converted from a disparity (i.e., binocular disparity) due to the gaze direction viewed from the left eye and the gaze direction viewed from the right eye.

In the disclosure, a gaze direction may refer to a direction in which a user gazes, and a gaze may refer to a virtual line directed from the user's pupil in the gaze direction. The gaze direction is calculated from information obtained from a gaze tracking sensor, and the gaze is estimated.

In the disclosure, a gaze point may refer to a point at which a user gazes, and may be calculated as a point at which gazes of both eyes of the user intersect. When the user views a 3D image using binocular disparity, the user recognizes a 3D image through the binocular disparity, so that a gaze point obtained through a convergence angle of both eyes of the user may be a point at which the user recognizes that there is a virtual object (i.e., a depth of a virtual image).

A general AR device may include an optical engine for generating a virtual image configured with light generated from a light source, and a waveguide including a transparent material to guide the virtual image generated by the optical engine to a user's eyes and enable the user to view the virtual image with a real world scene. As described above, because the AR device needs to show the real world scene together with the virtual image, an optical element for changing a path of light to have basic straightness may be needed to guide light generated by the optical engine to a user's eyes via the waveguide. In this case, the path of light may change through reflection by a mirror or the like, or through diffraction by a diffractive element such as a diffractive optical element (DOE) or a holographic optical element (HOE), but is not limited thereto.

Embodiments of the disclosure will now be described in detail with reference to accompanying drawings to be readily practiced by those of ordinary skill in the art. However, embodiments of the disclosure may have different forms and should not be construed as being limited to the embodiments set forth herein.

Embodiments of the disclosure will now be described in detail with reference to accompanying drawings.

FIG. 1A is a diagram of a structure of an AR device according to an embodiment. The AR device 1000 of the disclosure may be AR glasses in the form of glasses worn on a user's face. However, the disclosure is not limited thereto, and the AR device 1000 of the disclosure may be an HMD apparatus or an AR helmet which is worn on the user's head.

The AR device 1000 may provide virtual image content displayed on a waveguide 1100 as well as a real world object by executing an application. The AR device 1000 may provide the user with virtual image content displayed in each application by executing, for example, a movie application, a music application, a photo application, a gallery application, a web browser application, an e-book reader application, a game application, an AR application, a social networking service (SNS) application, a messenger application, an object recognition application, etc.

Referring to FIG. 1A, the AR device 1000 is a glass-type AR device configured to be worn by the user and includes a glass-type body. The AR device 1000 illustrated in FIG. 1A may include a frame 1010, temples 1020, and a nose bridge 1030.

The frame 1010 is a component in which glass lenses 1040L and 1040R are positioned, and may have a shape of two rims connected by the nose bridge 1030. The glass lenses 1040L and 1040R are merely an example, and may or may not have refractive power (strength). In an embodiment of the disclosure, the glass lenses 1040L and 1040R may be formed as a single body, and in this case, the rims of the frame 1010 and the nose bridge 1030 may not be distinguished from each other. The glass lenses 1040L and 1040R may also be omitted.

The temples 1020 are respectively connected to both ends of the frame 1010 and extend in one direction. The temples 1020 may include, for example, a material that is flexible by elasticity, but are not limited thereto. The frame 1010 and the temples 1020 may be connected by a hinge 1050. The hinge 1050 is merely an example, and a known member for connecting the frame 1010 to the temples 1020 may be used. As another example, the frame 1010 and the temples 1020 may be connected as a single body (or consecutively).

Figure 1B:
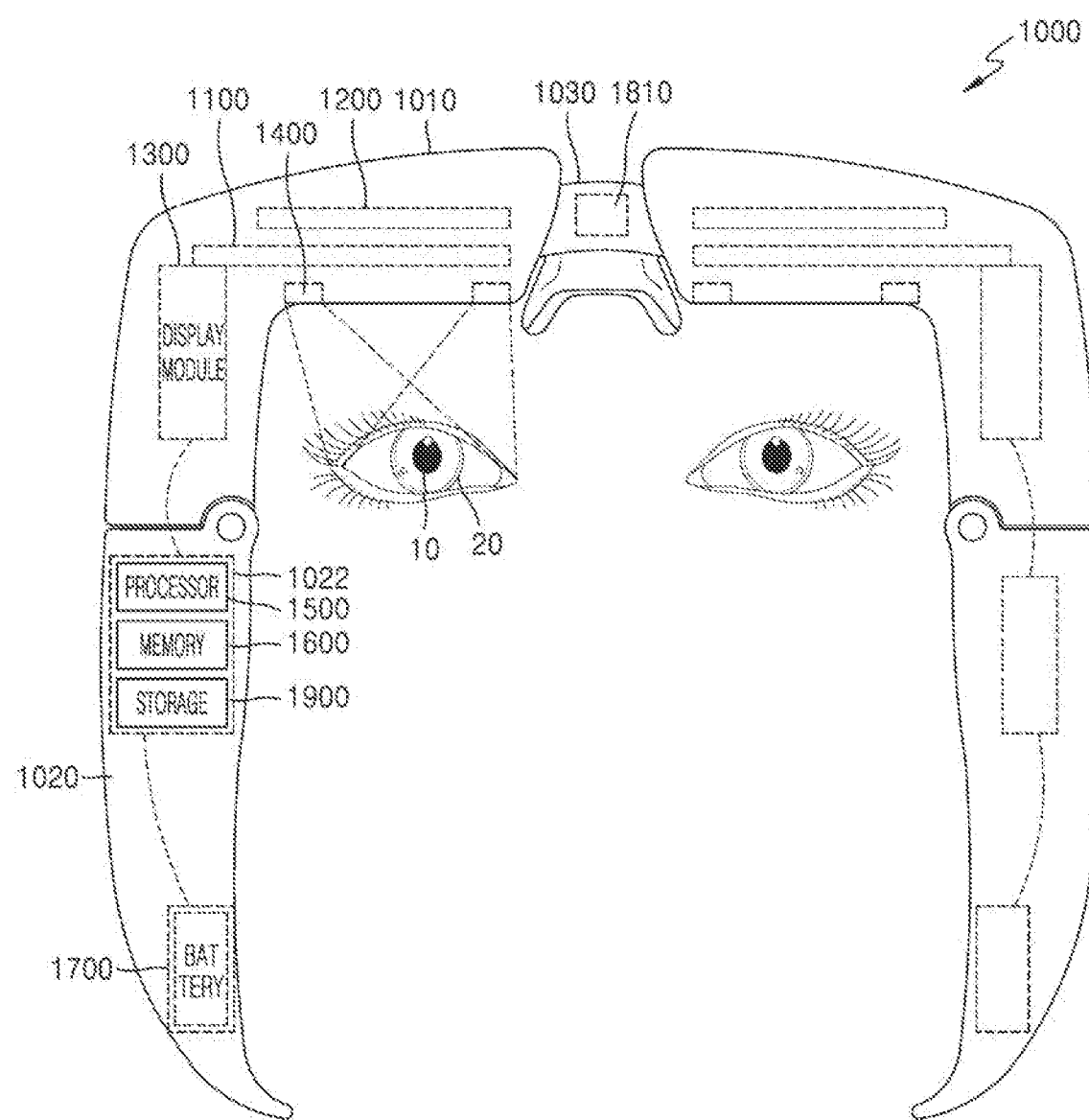
FIG. 1B is a diagram of an AR device according to an embodiment.

FIG. 1B is a diagram of an AR device according to an embodiment. The waveguide 1100 and a light transmission unit 1200 may be arranged in the frame 1010. The AR device 1000 may further include electronic components 1022, a display module 1300, and a gaze tracking sensor 1400.

Figure 2:
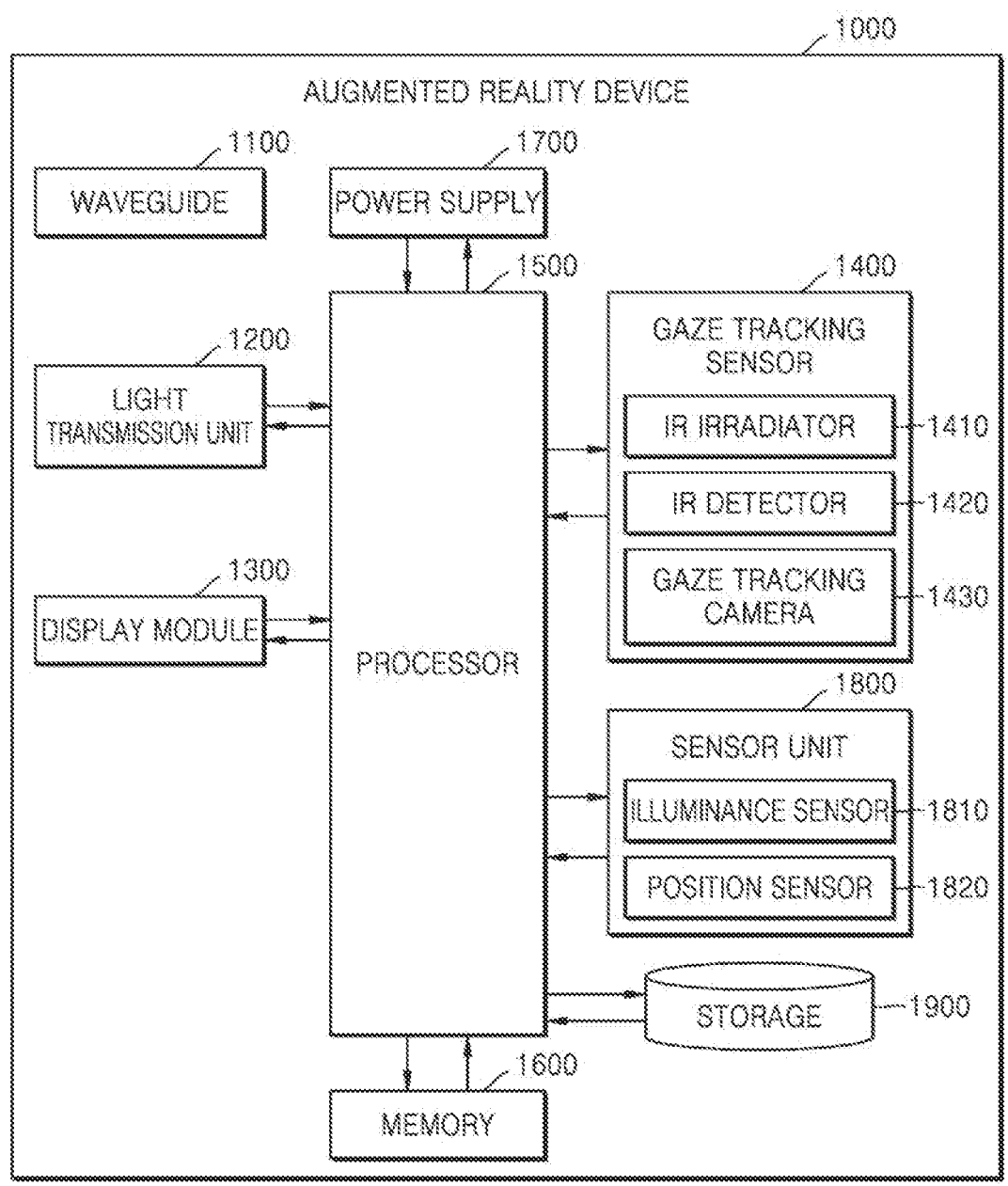
FIG. 2 is a diagram of components of an AR device, according to an embodiment.

FIG. 2 is a diagram of components of an AR device, according to an embodiment.

Referring to FIGS. 1B and 2, the AR device 1000 may include the frame 1010, the temples 1020, the nose bridge 1030, the waveguide 1100, the light transmission unit 1200, the display module 1300, the gaze tracking sensor 1400, a processor 1500, a memory 1600, a power supply 1700, a sensor unit 1800, and a storage 1900. In FIGS. 1B and 2, only components for describing an operation of the AR device 1000 are illustrated, and the components included in the AR device 1000 are not limited as illustrated in FIGS. 1B and 2.

Optical components are configured to transmit light of a virtual image output by the display module 1300 and light of a real scene to the user's eyes, and may include the waveguide 1100 and the light transmission unit 1200. Referring to FIGS. 1A and 1B, the optical components may be arranged on the left and right sides of the frame 1010, respectively. Left eye optical components and right eye optical components may be arranged or attached to the left glass lens 1040L and the right glass lens 1040R, respectively. Alternatively, the left eye optical components and the right eye optical components may be mounted on the frame 1010 separately from the glass lenses 1040L and 1040R. As another example, the left eye optical components and the right eye optical components may be configured as a single body and mounted on the frame 1010. As another example, the optical components may be arranged on only one of the left and right sides of the frame 1010.

The waveguide 1100 may include a transparent material through which a partial region of the rear surface of the waveguide 1100 is visible when the user wears the AR device 1000. The rear surface of the waveguide 1100 is a surface facing the user's eyes when the user wears the AR device 1000, and the front surface of the waveguide 1100 is a surface opposite to the rear surface (i.e., a side farther from the user's eyes). The waveguide 1100 may be configured as a flat plate having a single-layered or multi-layered structure including a transparent material that allows light to be reflected and propagated from the inside thereof.

The waveguide 1100 may include a plurality of regions that face an emission surface of the display module 1300, receive light of a virtual image projected from the display module 1300, propagate the light by using the principle of total reflection, change a path of the light, and finally output the light toward the user's eyes. A diffraction grid may be formed in each of the plurality of regions. The waveguide 1100 functions as a light guide plate. The user may simultaneously view the virtual image and the real world object via the waveguide 1100. The shape and characteristics of the waveguide 1100 will be described in detail with reference to FIG. 3.

The light transmission unit 1200 may be coupled to the frame 1010 and may be arranged on the front surface of the waveguide 1100. In this case, the front surface may refer to a positional relationship in which, when the user wears the AR device 1000, the light transmission unit 1200 is arranged far from the user's eyes and is arranged close to the real scene. In an embodiment of the disclosure, the light transmission unit 1200 may be arranged to be spaced apart from the waveguide 1100 by a preset distance, but is not limited thereto. In an embodiment of the disclosure, the light transmission unit 1200 may be coupled to the front surface of the waveguide 1100 by an optical clear adhesive.

The light transmission unit 1200 is a component that changes or adjusts a light transmittance of light incident from the outside in response to a supply voltage applied from the power supply 1700. The 'light transmittance' may refer to a ratio of an amount of transmitted light to an amount of incident light incident on the AR device 1000. When the light transmittance is increased by the light transmission unit 1200, an amount of light incident through the light transmission unit 1200 from the outside increases, and accordingly, brightness of a real world object viewed by the user increases. In contrast, when the light transmission unit 1200 is decreased by the light transmission unit 1200, the amount of the light incident through the light transmission unit 1200 from the outside decreases, and accordingly, the brightness of the real world object viewed by the user decreases.

The light transmission unit 1200 may include, for example, an indium tin oxide (ITO) layer, an electrochromic layer, an electrolyte layer, and an electrode. A specific structure of the light transmission unit 1200 will be described in detail with reference to FIG. 5.

The display module 1300 is configured to generate light of a virtual image and may be an optical engine of a projector including an image panel, an illumination optical system, a projection optical system, etc. The display module 1300 may include a left eye display module and a right eye display module. The display module 1300 may be arranged in the frame 1010, but is not limited thereto. The display module 1300 may be arranged on each of the temples 1020.

The display module 1300 may include a light source that outputs light, an image panel that forms a two-dimensional virtual image by using the light output from the light source, and a projection optical system that projects light of the virtual image formed by the image panel. The light source is an optical component that emits light, and may generate light by adjusting a red-green-blue (RGB) color. The light source may be configured as, for example, a light-emitting diode (LED). The image panel may be configured as a reflective image panel that modulates light emitted by the light source into light containing a two-dimensional image and reflects the light. The reflective image panel may be, for example, a digital micromirror device (DMD) panel, a liquid crystal on silicon (LCoS) panel, or another reflective image panel.

In an embodiment of the disclosure, the display module 1300 may include a light source that outputs light, and a two-axis scanner that two-dimensionally scans the light output from the light source.

In another embodiment of the disclosure, the display module 1300 may include a light source that outputs light, a linear image panel that forms a linear image (i.e., a one-dimensional image) by using the light output from the light source, and a one-axis scanner that scans light of the linear image formed by the linear image panel.

The display module 1300 may obtain image data constituting a virtual image from the processor 1500, generate the virtual image based on the obtained image data, and project light constituting the virtual image output from the light source to the waveguide 1100 through the emission surface. In an embodiment of the disclosure, the processor 1500 may provide, to the display module 1300, image data including RGB color and brightness values of a plurality of pixels constituting the virtual image, and the display module 1300 may project the light constituting the virtual image to the waveguide 1100 by controlling the light source according to an RGB color value and a brightness value of each of the plurality of pixels. In an embodiment of the disclosure, the display module 1300 may project the virtual image by using a transmissive projection technology in which a light source is modulated by white light emitted by an optically active material. A specific method and structure in which the display module 1300 projects the light constituting the virtual image to the waveguide 1100 will be described in detail with reference to FIG. 3.

The gaze tracking sensor 1400 is a device that tracks a gaze direction of the user's eye. The gaze tracking sensor 1400 may detect the user's gaze direction by detecting an image of the user's pupil or detecting a direction in which illumination light such as near-infrared rays is reflected from the user's cornea or an amount of the illumination light. The gaze tracking sensor 1400 includes a left eye gaze tracking sensor and a right eye gaze tracking sensor, which may detect a gaze direction of the user's left eye and a gaze direction of the user's right eye, respectively. The detecting of the user's gaze direction may include an operation of obtaining gaze information related to the user's gaze.

In an embodiment of the disclosure, the gaze tracking sensor 1400 may include one or a plurality of infrared irradiators 1410, a plurality of infrared detectors 1420, and a gaze tracking camera 1430. However, the disclosure is not limited thereto, and the gaze tracking sensor 1400 may include an infrared irradiator 1410 and an infrared detector 1420, or may include an infrared irradiator 1410 and a gaze tracking camera 1430. The gaze tracking sensor 1400 may obtain information on the user's eye by capturing an image of the user's eye, the information including a pupil size. In an embodiment of the disclosure, the gaze tracking sensor 1400 may provide, to the processor 1500, the image captured and obtained from the user's eye including a pupil and an iris.

A specific structure and operation of the gaze tracking sensor 1400 will be described in detail with reference to FIGS. 5A and 5B.

The electronic components 1022 may include the processor 1500, the memory 1600, and the storage 1900, and may be positioned in any one of the frame 1010 or the temples 1020 or may be distributed in a plurality of positions, and may be mounted on a printed circuit board (PCB), a flexible PCB (FPCB), etc.

The processor 1500 may be electrically and/or physically connected to the light transmission unit 1200, the display module 1300, and the gaze tracking sensor 1400. The processor 1500 may include at least one hardware of, for example, a central processing unit (CPU), a microprocessor, a graphic processing unit (GPU), an application specific integrated circuit (ASIC), a digital signal processor (DSP), a digital signal processing device (DSPD), a programmable logic device (PLD), and a field programmable gate array (FPGA), but is not limited thereto.

The memory 1600 may store a program including one or more instructions. The memory 1600 may include a hardware device of, for example, a flash memory type, or at least one type of a random access memory (RAM), a static random access memory (SRAM), a read-only memory (ROM), an electrically erasable programmable read-only memory (EEPROM), a programmable read-only memory (PROM), a magnetic memory, a magnetic disk, o an optical disk.

The processor 1500 may obtain an image of the user's eye (hereinafter, referred to as the "eye image") from the gaze tracking sensor 1400, measure a pupil size from the eye image by performing image processing on the eye image, and adjust or change brightness of the light constituting the virtual image based on the pupil size. In an embodiment of the disclosure, the processor 1500 may adjust or change a light transmittance of the light transmission unit 1200 based on the pupil size.

In an embodiment of the disclosure, the processor 1500 may adjust the light transmittance in proportion to the measured pupil size, and adjust brightness of the display module 1300 in inverse proportion to the measured pupil size.

In an embodiment of the disclosure, the processor 1500 may obtain the image of the user's eye through image capturing using the gaze tracking sensor 1400. The processor 1500 may identify the iris and the pupil by using a known image processing method. In an embodiment of the disclosure, the processor 1500 may detect, as the pupil, a region having a lowest brightness and a circular shape by performing image processing on the eye image obtained from the gaze tracking sensor 1400. The processor 1500 may obtain information on the pupil size by measuring a diameter of the region detected as the pupil. In the same manner, the processor 1500 may detect a region of the iris and obtain information on a size of the detected region of the iris.

In another embodiment of the disclosure, the processor 1500 may also identify the iris and the pupil from the eye image by using a pre-trained deep neural network model. The pre-trained deep neural network model may be an artificial intelligence model trained through supervised learning using a plurality of pre-obtained images of the iris and the pupil as inputs and label values of the iris and the pupil as ground truths. The deep neural network model may be, for example, a convolutional neural network (CNN) model. However, the disclosure is not limited thereto, and the deep neural network model may be a known artificial intelligence model including at least one of a recurrent neural network (RNN) model, a restricted Boltzmann machine (RBM), a deep belief network (DBN), a bidirectional recurrent deep neural network (BRDNN), or deep Q-networks.

In an embodiment of the disclosure, the processor 1500 may obtain information on the pupil size in real time by measuring the pupil size at a preset time interval. For example, when the time interval is 10 seconds, the processor 1500 may periodically measure the pupil size at an interval of 10 seconds.

The processor 1500 may measure a size of a region corresponding to the identified pupil and determine brightness of light constituting a virtual image based on the measured pupil size. The processor 1500 may determine a light transmittance of external light based on the measured pupil size. In general, the pupil changes in size in a range of about 2 mm to about 8 mm, and the pupil size changes based on an amount of light. A change in the pupil size is caused by pupillary reflex and means that the pupil size increases or decreases to adjust an amount of light incident on the eye. The pupil size and brightness of the light incident on the eye have a non-linear relationship, and as the brightness of the light increases, the pupil size decreases. When the pupil size is enlarged, it means that the brightness of the light is low, and it may be preferred to increase the brightness of the light constituting the virtual image. When the pupil size is reduced, it means that the brightness of the light is high, and in this case, it may be preferred to darken the virtual image by decreasing the brightness of the light constituting the virtual image.

In an embodiment of the disclosure, the processor 1500 may measure a size of a diameter of the detected region of the pupil, and calculate a pupil size ratio by performing an operation of dividing the measured size of the diameter of the pupil by a size of a diameter of the iris. In an embodiment of the disclosure, the processor 1500 may compare the calculated pupil size ratio with a reference pupil size ratio and determine a light transmittance and/or brightness of the light of the virtual image based on a result of the comparing. In this case, the reference pupil size ratio is a pupil size ratio that serves as a reference to determine the light transmittance of the light transmission unit 1200 and/or the brightness of the light of the virtual image, and may be determined from the pupil size according to the light transmittance and the brightness of the light of the virtual image in a state in which the user feels comfort. In an embodiment of the disclosure, a reference pupil size may be determined based on an average value of pupil sizes according to a light transmittance of external light and brightness of light of a virtual image, which are preferred by a plurality of users in a comfortable state, according to data previously obtained through an experiment. In an embodiment of the disclosure, the reference pupil size may be determined based on at least one of an age of a specific user, a preference for a light transmittance and brightness of a virtual image according to identification information, or a type of an application being executed on the AR device 1000.

In an embodiment of the disclosure, the processor 1500 may perform a calibration process in which the user feels comfort or which allows to set a preferred state by controlling the light transmission unit 1200 to differently set an amount of external light, differently setting brightness of light constituting a virtual image projected to the waveguide 1100 to display the virtual image on the display module 1300. The processor 1500 may measure a pupil size of the user under conditions for the light transmittance and the brightness of the light of the virtual image, which are determined according to a result of the calibration process, and may also determine the measured pupil size as the reference pupil size. In this case, the processor 1500 may store information on the determined reference pupil size in the storage 1900.

The processor 1500 may compare a pupil size ratio calculated from the eye image with the reference pupil size ratio and determine the light transmittance and/or the brightness of the light of the virtual image based on a result of the comparing. In an embodiment of the disclosure, the processor 1500 may adjust or change the brightness of the light constituting the virtual image in inverse proportion to the pupil size ratio. For example, the processor 1500 may decrease the brightness of the light constituting the virtual image as the pupil size ratio is greater than the reference pupil size ratio, and may increase the brightness of the light constituting the virtual image as the pupil size ratio is smaller than the reference pupil size ratio. In an embodiment of the disclosure, the processor 1500 may adjust or change the light transmittance of the external light in proportion to the pupil size ratio. For example, the processor 1500 may increase the light transmittance of the light transmission unit 1200 as the pupil size ratio is greater than the reference pupil size ratio, and decrease the light transmittance of the light transmission unit 1200 as the pupil size ratio is smaller than the reference pupil size ratio.

The processor 1500 may determine the light transmittance of the light transmission unit 1200 and/or the brightness of the light of the virtual image in consideration of other factors as well as the pupil size. In an embodiment of the disclosure, the processor 1500 may also adjust the light transmittance and/or the brightness of the light constituting the virtual image based on a distance between a position of a gaze point according to the user's gaze direction obtained through the gaze tracking sensor 1400 and a position at which the virtual image is displayed. In an embodiment of the disclosure, the processor 1500 may track a direction and a position of the user's gaze by using respective eye images of the left and right eyes captured by the gaze tracking sensor 1400. The processor 1500 may obtain 3D position coordinate information on a gaze point at which gaze directions of the left and right eyes converge, and may measure a distance between the 3D position coordinate information on the gaze point and a region in which the virtual image is displayed. The processor 1500 may determine the light transmittance and/or the brightness of the light of the virtual image based on the pupil size and the measured distance between the 3D position coordinate information on the gaze point and the region in which the virtual image is displayed. In an embodiment of the disclosure, the processor 1500 may adjust or change the brightness of the light constituting the virtual image according to a relationship inversely proportional to a distance between the gaze point and the virtual image. In an embodiment of the disclosure, the processor 1500 may adjust or change the light transmittance according to a relationship to be proportional to the distance between the gaze point and the virtual image.

A specific embodiment of the disclosure, in which the processor 1500 determines the light transmittance and/or the brightness of the light of the virtual image based on the distance between the 3D position coordinates of the gaze point and the region in which the virtual image is displayed, will be described in detail with reference to FIGS. 14A to 17.

In an embodiment of the disclosure, the processor 1500 may determine the light transmittance of the light transmission unit 1200 based on an illuminance of an external environment measured through an illuminance sensor 1810. For example, the processor 1500 may adjust the light transmittance in inverse proportion to a measured illuminance value of the external environment.

In an embodiment of the disclosure, the processor 1500 may determine a light transmittance T of the light transmission unit 1200 as defined in Equation (1) below.

$$T \propto \frac{R}{L} \times \sqrt{D + \alpha} \qquad (1)$$

According to Equation (1), the processor 1500 may determine or adjust the light transmittance T based on a pupil size ratio R measured from an eye image, an illuminance L of an external environment, a distance D between a gaze point and a region in which a virtual image is displayed, and a calibration value $\alpha$.

In an embodiment of the disclosure, the processor 1500 may determine a brightness B of light constituting a virtual image as defined in Equation (2) below.

$$B \propto \frac{1}{R\sqrt{D + \alpha}} \qquad (2)$$

According to Equation (2), the processor 1500 may determine or adjust the brightness B of the light of the virtual image based on the pupil size ratio R measured from the eye image, the distance D between the gaze point and the region in which the virtual image is displayed, and the calibration value $\alpha$.

However, Equations (1) and (2) are merely examples, and the processor 1500 is not limited to determining the light transmittance T and the brightness B of the light of the virtual image according to Equations (1) and (2).

The processor 1500 may change the light transmittance of the light transmission unit 1200 by determining a supply voltage corresponding to the determined light transmittance and supplying the supply voltage to the light transmission unit 1200 through the power supply 1700. The processor 1500 may create a relationship between supply voltage values and the light transmittance in the form of a look-up table (LUT) and store the LUT in the storage 1900. For example, in the LUT, it may be stored that when the light transmittance is 100%, a supply voltage having a value of −1.85 V is applied, when the light transmittance is 50%, a supply voltage having a value of −0.55 V is applied, and when the light transmittance is 10%, a supply voltage having a value of 0.45 V is applied. However, this is merely an example, and the disclosure is not limited to the aforementioned voltage values.

The processor 1500 may change brightness of the display module 1300 based on the determined brightness of the light of the virtual image. The processor 1500 may change the brightness of the display module 1300 according to a brightness value of light of a virtual image displayed on the waveguide 1100 by adjusting a value of a current applied to the display module 1300.

The power supply 1700 may be electrically and/or physically connected to the light transmission unit 1200, the display module 1300, the gaze tracking sensor 1400, and the processor 1500 via a wired cable, and may supply power to the light transmission unit 1200, the display module 1300, and the gaze tracking sensor 1400 under control by the processor 1500. The power supply 1700 may include at least one battery module and a charging module that charges the at least one battery module through power input from an external power source. The power supply 1700 may supply, to the light transmission unit 1200 and the display module 1300, supply power determined according to the control by the processor 1500. The light transmittance of the light transmission unit 1200 and the brightness of the display module 1300 may be determined or changed according to a value of a voltage supplied by the power supply 1700.

The sensor unit 1800 may include the illuminance sensor 1810 and a position sensor 1820.

The illuminance sensor 1810 may detect an ambient illuminance of the AR device 1000. The illuminance sensor 1810 may provide, to the processor 1500, an illuminance signal corresponding to the detected illuminance (e.g., an analog illuminance sensor provides an analog signal, or a digital illuminance sensor provides a digital signal). An illuminance measured by the illuminance sensor 1810 may have a value of about 0 lux to about 700 lux. However, the disclosure is not limited thereto.

In an embodiment of the disclosure, the illuminance sensor 1810 may use a function of a camera. In this case, the AR device 1000 may measure an illuminance of a surrounding environment through a quantity of photons detected through an image sensor of the camera.

In an embodiment of the disclosure, the illuminance sensor 1810 illustrated in FIG. 1B may be replaced with a camera. That is, a camera may be arranged on the nose bridge 1030 illustrated in FIG. 1B. The camera arranged on the nose bridge 1030 may be configured as a front camera that captures an image of a real world object positioned in front of the AR device 1000.

The position sensor 1820 may obtain position information on the AR device 1000. In an embodiment of the disclosure, the position sensor 1820 may obtain a current position or position coordinates of the AR device 1000. For example, the position sensor 1820 may include a global positioning system (GPS) sensor.

Though not illustrated in the drawings, the sensor unit 1800 may include at least one of a proximity sensor that detects whether a surrounding real world object approaches the AR device 1000, a gyro sensor that detects a tilt of the AR device 1000 by using rotational inertia, an acceleration sensor that detects a movement state of three axes (e.g., an x-axis, a y-axis, and a z-axis) applied to the AR device 1000, a gravity sensor that detects a direction of gravitational action, or an altimeter that detects an altitude by measuring atmospheric pressure.

The storage 1900 may be a storage medium that stores information generated or obtained by the processor 1500. In an embodiment of the disclosure, the storage 1900 may store at least one of information on a light transmittance of the light transmission unit 1200 and a brightness value of the display module 1300 according to a pupil size, a reference pupil size ratio according to a user's identification information (e.g., a user ID), calibration information according to the user's identification information, information on a light transmittance of the light transmission unit 1200 and a brightness value of the display module 1300 according to an ambient illuminance, or information on a light transmittance and brightness of the display module 1300 according to a type of an application being executed.

In an embodiment of the disclosure, the storage 1900 may store an LUT for a value of a supply voltage applied to the light transmission unit 1200 according to the light transmittance.

In an embodiment of the disclosure, the storage 1900 may store information on a brightness value of the display module 1300 determined according to the brightness of the light constituting the virtual image.

The storage 1900 may be configured as a non-volatile memory. The non-volatile memory may refer to a storage medium that stores and maintains information even when power is not supplied and may use the stored information again when power is supplied. The non-volatile memory may include at least one of, for example, flash memory, a hard disk, a solid state drive (SSD), a ROM, a magnetic memory, a magnetic disk, or an optical disk.

Though the storage 1900 is illustrated as a component included in the AR device 1000 in FIG. 2, the disclosure is not limited thereto. In an embodiment of the disclosure, the storage 1900 may be implemented as an external component that is not included in the AR device 1000, for example, a memory of an external memory type (e.g., a multimedia card micro type and a card type (e.g., a secure digital (SD) or extreme digital (XD) memory), or may be implemented as a component included in a server. In this case, the AR device 1000 may be connected to the storage 1900 via wired/wireless communication.

Figure 3:
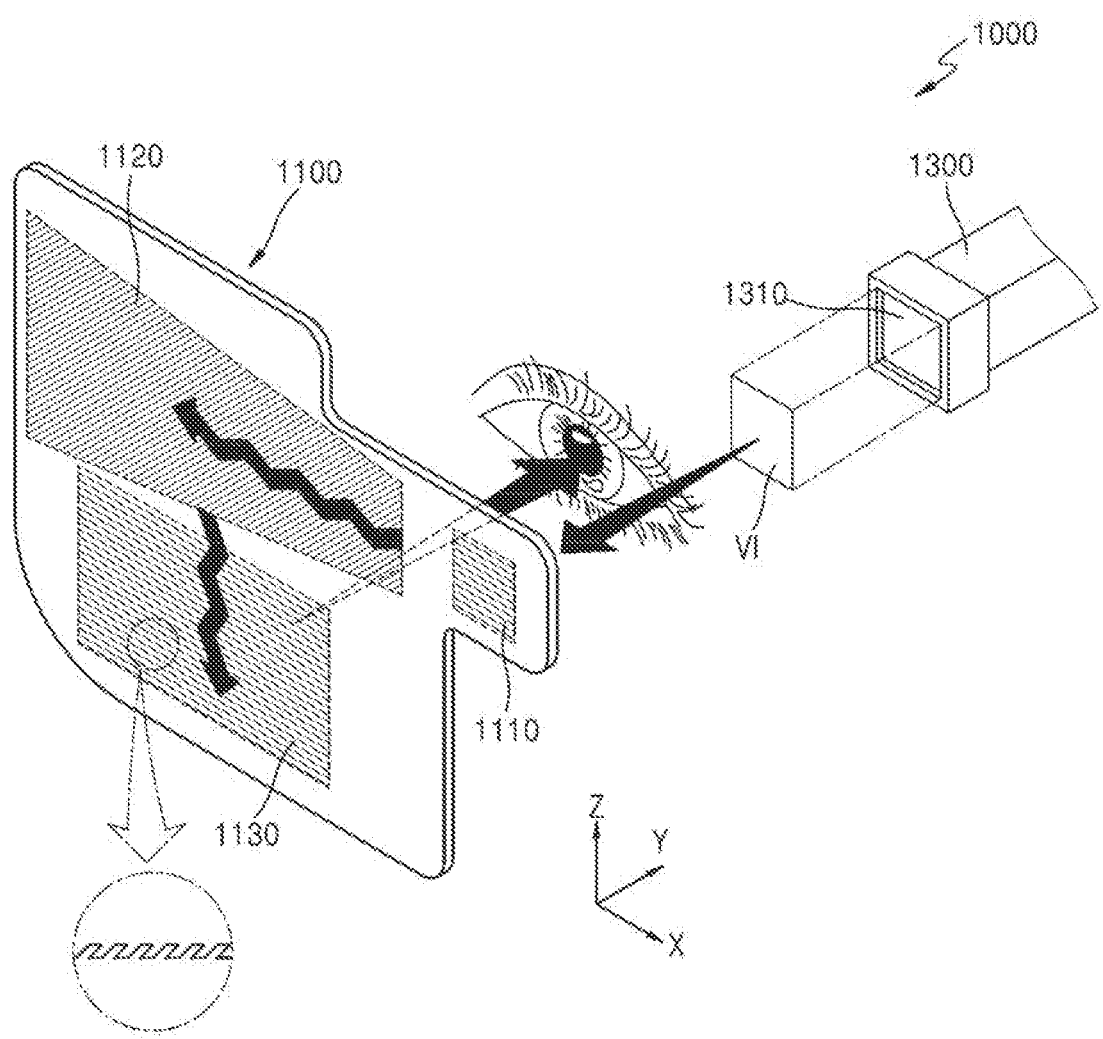
FIG. 3 is a diagram of a waveguide and a display module, which are components of an AR device, according to an embodiment.

FIG. 3 is a diagram of a waveguide and a display module, which are components of an AR device, according to an embodiment.

Referring to FIG. 3, the waveguide 1100 may include a transparent material through which a partial region of the rear surface of the waveguide 1100 is visible when a user wears the AR device. The rear surface of the waveguide 1100 is a surface facing the user's eyes when the user wears the AR device, and the front surface of the waveguide 1100 is a surface opposite to the rear surface (i.e., a side farther from the user's eyes).

The waveguide 1100 may be configured as a flat plate having a single-layered or multi-layered structure including a transparent material that allows light to be reflected and propagated from the inside thereof. The waveguide 1100 may include a first region 1110 that faces an emission surface 1310 of the display module 1300 and receives light constituting a projected virtual image VI, a second region 1120 in which the light constituting the virtual image VI incident on the first region 1110 propagates, and a third region 1130 that outputs the light of the virtual image VI propagated from the second region 1120 toward the user's eyes. In this case, the transparent material may refer to a material through which light may pass, may not have a transparency of 100%, and may also have a preset color.

In an embodiment of the disclosure, because the waveguide 1100 includes a transparent material, the user may not only view a virtual object in the virtual image VI but may also view a real scene via the AR device, and thus, the waveguide 1100 may be referred to as a see-through display. AR may be implemented by outputting the virtual object in the virtual image VI via the waveguide 1100.

Diffraction grids may be formed in the first region 1110, the second region 1120, and the third region 1130 to change an optical path of light constituting the virtual image VI. The waveguide 1100 may perform a function of a light guide plate which changes a propagation path of the light of the virtual image VI by using the diffraction grids formed in the first region 1110, the second region 1120, and the third region 1130, and finally outputs the light of the virtual image VI reflected through the third region 1130 to the user's eyes.

A diffraction grid may be formed in the first region 1110 so that the light of the virtual image VI incident from the emission surface 1310 of the display module 1300 is transmitted in an X-axis direction. The display module 1300 may be arranged so that emitted light is incident to be perpendicular to the first region 1110 or inclined at a preset angle. The arrangement direction of the display module 1300 as described above may vary according to a pattern of the diffraction grid of the first region 1110.

The second region 1120 may be arranged to be spaced apart from the first region 1110 in the X-axis direction. A diffraction grid may be formed in the second region 1120 to propagate at least a portion of the light received from the first region 1110 downward in a Z-axis direction. When the waveguide 1100 has a single-layered structure, the diffraction grid of the second region 1120 may be formed on a same plane as the diffraction grid of the first region 1110. Alternatively, when the waveguide 1100 has a multi-layered structure, the diffraction grid of the second region 1120 may be formed on a layer different from a layer on which the diffraction grid of the first region 1110 is formed. Light incident on the first region 1110 is reflected between the front and rear surfaces of the waveguide 1100 and propagated.

The third region 1130 may be spaced apart under the third region 1130 in the Z-axis direction. A diffraction grid may be formed in the third region 1130 so that at least a portion of the light propagated from the second region 1120 is output on a two-dimensional plane. When the waveguide 1100 has a single-layered structure, the diffraction grid of the third region 1130 may be formed on a same plane as the diffraction grids of the first region 1110 and the second region 1120. Alternatively, when the waveguide 1100 has a multi-layered structure, the diffraction grid of the third region 1130 may be formed on a layer different from the layer on which the diffraction grid of the second region 1120 is formed, and may be formed on a layer same as or different from the layer on which the diffraction grid of the first region 1110 is formed.

The diffraction grid of the first region 1110, the diffraction grid of the second region 1120, and diffraction grid of the third region 1130 may have different patterns.

The display module 1300 may project the light constituting the virtual image VI generated by the processor 1500 (FIG. 2) to the waveguide 1100 through the emission surface 1310. The display module 1300 of the disclosure may function as a projector.

The display module 1300 may further include an illumination optical system, an optical path converter, an image panel, a beam splitter, and a projection optical system.

The illumination optical system is an optical component that emits light, and may include a light source and lenses. The light source is a component that generates light by adjusting an RGB color, and may be configured as, for example, an LED.

The image panel may be a reflective image panel that modulates light emitted by the light source into light containing a two-dimensional image, and reflects the light. The reflective image panel may be, for example, a DMD panel, an LCoS panel, or another known reflective image panel. The DMD panel may operate in a digital light processing (DLP) method in which RGB of light output from the light source is illuminated with a plurality of mirrors each having a pixel size, the RGB of the light is mixed by switching each of the plurality of mirrors on/off, and a virtual image VI is projected. The LCoS panel may operate in a liquid crystal display (LCD) method in which light output from the light source is split into RGB through a mirror that allows only light of a specific wavelength to pass therethrough and is input to the image panel, and a virtual image VI generated by mixing the RGB is projected.

The beam splitter may be arranged between the image panel and the projection optical system. The beam splitter may be configured to reflect light output from the light source and pass the light reflected by the image panel therethrough.

The projection optical system is a component that projects light containing the image reflected by the image panel to the waveguide 1100, and may include one or a plurality of projection lenses. In the embodiment illustrated in FIG. 3, a projection plane of the projection optical system may refer to an emission surface 1310 of an outermost projection lens among the one or plurality of projection lenses.

The display module 1300 may obtain image data constituting the virtual image VI from the processor (FIG. 2), generate the virtual image VI based on the obtained image data, and project the virtual image VI to the waveguide 1100 through the emission surface 1310 together with the light output from the light source. In an embodiment of the disclosure, the processor 1500 may provide, to the display module 1300, image data including RGB color and brightness values of a plurality of pixels constituting the virtual image VI. The display module 1300 may perform image processing by using RGB color and brightness values of each of the plurality of pixels, and project the virtual image VI to the waveguide 1100 by controlling the light source.

In an embodiment of the disclosure, the display module 1300 may generate the virtual image VI by using image data stored in the storage 1900 (see FIG. 2), combine the virtual image VI with light by controlling the light source, and project the light of the virtual image VI to the waveguide 1100.

Figure 4:
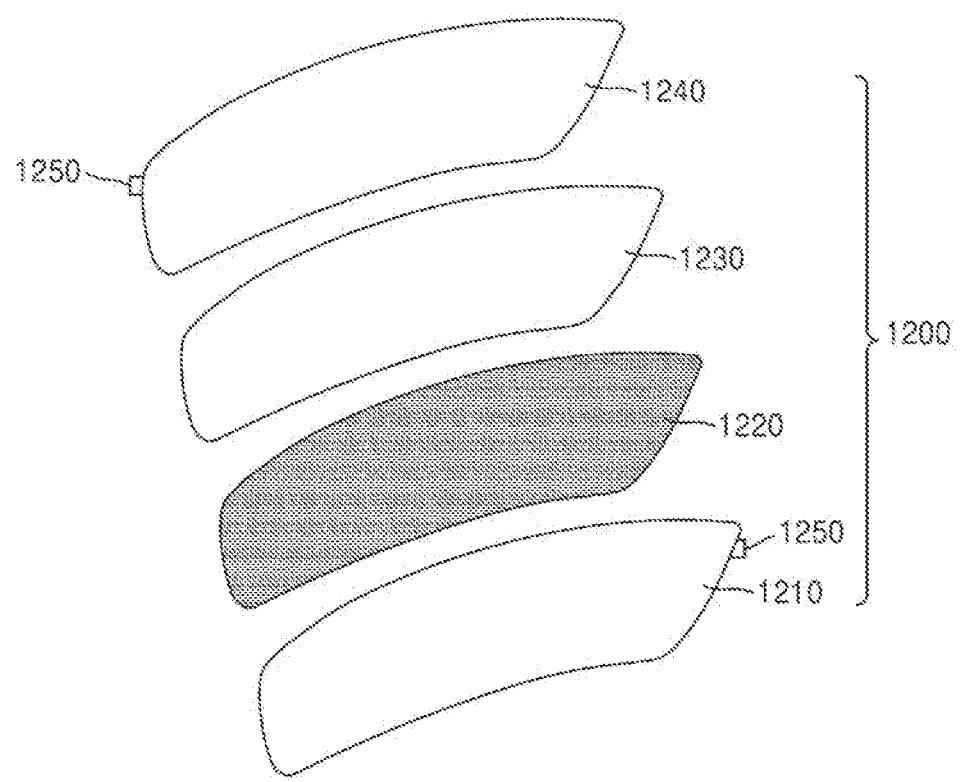
FIG. 4 is a diagram of a light transmission unit, which is a component of an AR device, according to an embodiment.

FIG. 4 is a diagram of a light transmission unit, which is a component of an AR device, according to an embodiment.

The light transmission unit 1200 may be configured to adjust a light transmittance of external light in response to a supply voltage or a supply current input from the power supply 1700 (FIG. 2). Referring to FIG. 4, the light transmission unit 1200 may include a first ITO layer 1210, an electrochromic layer 1220, an electrolyte layer 1230, a second ITO layer 1240, and an electrode 1250. The ITO layer may include an ITO film or ITO glass. Also, the ITO layer may be implemented with silver nanowires, copper meshes, silver meshes, silver salts, and silver nanoparticles that may be replaced with ITO.

The light transmission unit 1200 may include the first ITO layer 1210, the electrochromic layer 1220 that is positioned on the first ITO layer 1210 and has a light transmittance changed in response to the supply voltage, the electrolyte layer 1230 positioned on the electrochromic layer 1220, the second ITO layer 1240 positioned on the electrolyte layer 1230, and the electrode 1250 that is connected to the first ITO layer 1210 and the second ITO layer 1240 and has the supply voltage input thereto.

The electrochromic layer 1220 may change the light transmittance by using a phenomenon in which a color is reversibly changed by an electric field direction according to the input supply voltage. The electrochromic layer 1220 may use a material (e.g., included in an electrochromic layer) having optical characteristics that may be reversibly changed by electrochemical oxidation and reduction reactions. The electrochromic layer 1220 may change the light transmittance (or a light reflectance) by causing chemical changes in a material, that is, oxidation and reduction reactions, by using the supply voltage (or current).

An electrochromic material may include, for example, titanium dioxide ($TiO_2$), ITO, which is often used as a transparent electrode material, various organic materials such as an alloy of magnesium and calcium, an alloy of magnesium and titanium, etc., an inorganic material, or a combination of an organic material and an inorganic material.

In an embodiment of the disclosure, the electrochromic layer 1220 illustrated in FIG. 4 may be replaced with a suspended particle layer including a suspended particle unit, a liquid crystal layer including a liquid crystal unit, or a photochromic layer including a photochromic unit. The suspended particle unit has a structure in which a film, which is conductive, is arranged between two transparent plates (e.g., ITO). The film includes fine and dispersed suspended particles that absorb light. When the supply voltage is not input, suspended particles absorb light and thus appear black. When the supply voltage is input, suspended particles may be aligned and pass through incident light.

A liquid crystal of the liquid crystal unit has both fluidity of a liquid and a regular molecular arrangement like that of a solid crystal. An arrangement of liquid crystal molecules is deformed by the supply voltage, and when the supply voltage is not input, the liquid crystal molecules return to the original state due to an elastic restoration force. The liquid crystal unit may change the light transmittance by using the aforementioned principle of operation. The liquid crystal unit may further change the light transmittance through alloying with other metals. The liquid crystal layer may be implemented in various forms such as a thin film, a film, or glass.

The photochromic unit may change the light transmittance by using a dye (e.g., a D-shine photochromic dye) in which color conversion occurs by ultraviolet rays or electrically generated ultraviolet rays.

The electrode 1250 may be implemented as a transparent electrode. It would be readily understood by one of ordinary skill in the art that a position of each electrode 1250 (e.g., the upper right of the first ITO layer 1210 or the upper left of the second ITO layer 1240) may be changed in response to the performance or structure of the AR device 1000.

Figure 5A:
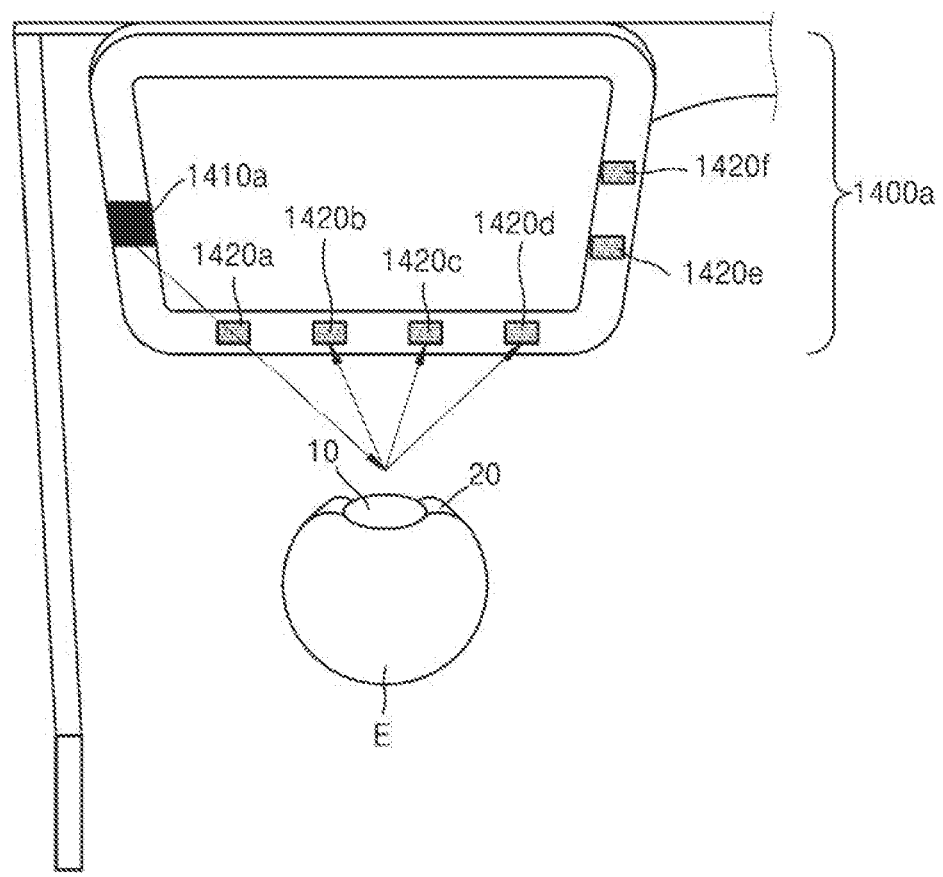
FIG. 5A is a diagram of a gaze tracking sensor, which is a component of an AR device, according to an embodiment.

FIG. 5A is a diagram of a gaze tracking sensor, which is a component of an AR device, according to an embodiment.

Referring to FIG. 5A, the gaze tracking sensor 1400*a* may include an infrared irradiator 1410*a* and a plurality of infrared detectors 1420*a* to 1420*f*. Though six infrared detectors 1420*a* to 1420*f* are illustrated in FIG. 5A, this is for convenience of description, and the number of the plurality of infrared detectors 1420*a* to 1420*f* is not limited as illustrated.

The infrared irradiator 1410*a* may irradiate infrared light to the cornea in which the lens of an eye E is positioned, and the plurality of infrared detectors 1420*a* to 1420*f* may detect the infrared light reflected from the cornea. In an embodiment of the disclosure, the gaze tracking sensor 1400*a* may obtain information on an amount of infrared light detected by each of the plurality of infrared detectors 1420*a* to 1420*f*, and may obtain information on a gaze direction of the user's eye E based on the obtained amount of infrared light. The gaze tracking sensor 1400*a* may provide the obtained information on the gaze direction to the processor 1500 (FIG. 2). For example, the information on the gaze direction obtained by the gaze tracking sensor 1400*a* may include gaze angle information in horizontal and vertical directions of the left eye and gaze angle information in horizontal and vertical directions of the right eye.

Though it is described as an example that the gaze tracking sensor 1400*a* in the present embodiment uses an infrared (IR) scanner method using infrared illumination light, the disclosure is not limited thereto. As another example, the gaze tracking sensor 1400*a* may include an image sensor that captures an image of a person's pupil 10 and iris 20. A gaze tracking sensor 1400*b* including an image sensor will be described in detail with reference to FIG. 5B.

FIG. 5B is a diagram of a gaze tracking sensor, which is a component of an AR device, according to an embodiment.

Referring to FIG. 5B, the gaze tracking sensor 1400*b* may track the user's gaze based on positions of reflected lights 511, 512, 513, 514, and 515 reflected from the user's eye E, and thus may obtain information on the gaze direction. The gaze tracking sensor 1400*b* may include a light source 1410*b* and a camera 1430*b*.

The light source 1410*b* may include an infrared light-emitting diode (IR LED). In the embodiment illustrated in FIG. 5B, the light source 1410*b* may include a plurality of LEDs arranged at different positions. The light source 1410*b* may provide light (e.g., infrared light) to the eye E when an image of the user's eye E is captured. Because the light is provided to the user's eye E, reflected light that is reflected from the user's eye E may be generated.

The camera 1430*b* may be configured as at least one camera. The camera 1430*b* may be implemented as an IR camera. The AR device may track a gaze of the user's eye E by using images 501 to 505 of the user's eye E (hereinafter, referred to as the eye images 501 to 505 of the user) which are captured by the camera 1430*b*. For example, the gaze tracking sensor 1400*b* may track the user's gaze by detecting the pupil 10 and the reflected lights 511 to 515 in the eye images 501 to 505 of the user, and thus may obtain a gaze vector. The gaze tracking sensor 1400*b* may detect positions of the pupil 10 and the reflected lights 511 to 515 in the eye images 501 to 505 of the user, and may determine the gaze direction of the user's eye E based on a relationship between the position of the pupil 10 and the positions of the reflected lights 511 to 515.

For example, the gaze tracking sensor 1400*b* may detect the pupil 10 and the reflected light 511 in a captured first eye image 501, and may determine a gaze direction 521 of the user's eye E based on a relationship between the position of the pupil 10 and the position of the reflected light 511. In the same manner, the pupil 10 and the reflected lights 512, 513, 514, and 515 may be detected in second to fifth eye images 502, 503, 504, and 505, respectively, and gaze directions 522, 523, 524, and 525 of the user's eye E may be determined based on relationships between the position of the pupil 10 and the positions of the reflected lights 512, 513, 514, and 515, respectively.

In an embodiment of the disclosure, the gaze tracking sensor 1400*b* may obtain a gaze vector based on the determined information on the gaze direction. The gaze tracking sensor 1400*b* may provide, to the processor 1500 (FIG. 2), a vector value of the obtained gaze vector and data about a direction of the gaze vector.

In another embodiment of the disclosure, the gaze tracking sensor 1400*b* may provide, to the processor 1500 (FIG. 2), only coordinate values of the position of the pupil 10 and the positions of the reflected lights 511 to 515 detected in the plurality of eye images 501 to 505, and the processor 1500 may calculate the gaze vector of the user's eye E based on the coordinate values obtained from the gaze tracking sensor 1400*b*.

In an embodiment of the disclosure, the gaze tracking sensor 1400*b* may provide the plurality of eye images 501 to 505 to the processor 1500. The processor 1500 may detect regions corresponding to the pupil 10 and the iris 20 from the plurality of eye images 501 to 505.

Figure 6:
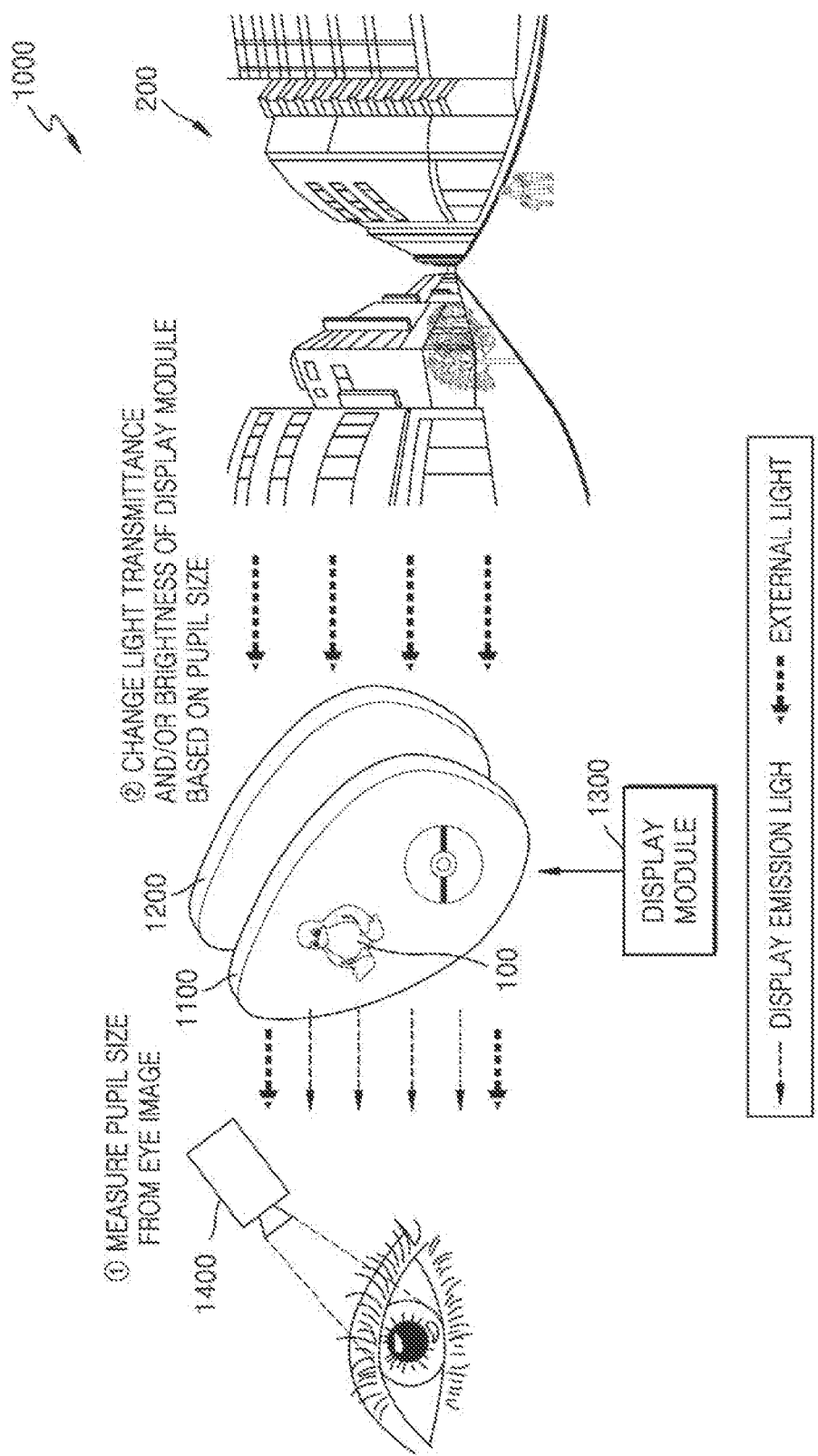
FIG. 6 is a diagram for describing an operation of an AR device to change a light transmittance of a light transmission unit and/or brightness of a display module based on a pupil size of a user, according to an embodiment.

FIG. 6 is a diagram for describing an operation of an AR device to change a light transmittance of a light transmission unit and/or brightness of a display module based on a pupil size of a user, according to an embodiment.

Referring to FIG. 6, the AR device 1000 may include the waveguide 1100, the light transmission unit 1200, the display module 1300, and the gaze tracking sensor 1400. Each of the waveguide 1100 and the light transmission unit 1200 may include a transparent material and may be referred to as a see-through display. The user may view both a virtual image 100 and a real world object 200 in a real scene via the AR device 1000.

The waveguide 1100 is a component that allows the user to view the virtual image 100 by receiving light of the virtual image 100 projected from the display module 1300, propagating the light, and changing an optical path. The waveguide 1100 may include a plurality of regions that face the emission surface of the display module 1300, receive the light of the virtual image 100 projected from the display module 1300, propagates the light, changes the optical path, and finally outputs the light toward the user's eye. A diffraction grid may be formed in each of the plurality of regions. The waveguide 1100 may function as a light guide plate. The user may simultaneously view the virtual image 100 and the real world object 200 via the waveguide 1100.

The brightness of light of the virtual image 100 incident on the waveguide 1100 may be determined according to brightness of light projected from the display module 1300.

The light transmission unit 1200 may adjust a light transmittance of external light incident on the AR device 1000 from the outside. When the light transmittance is increased by the light transmission unit 1200, an amount of light incident through the light transmission unit 1200 from the outside increases, and accordingly, a brightness of the real world object 200 viewed by the user increases. In contrast, when the light transmittance is decreased by the light transmission unit 1200, the amount of light incident through the light transmission unit 1200 from the outside decreases, and accordingly, the brightness of the real world object 200 viewed by the user decreases.

The display module 1300 may project the virtual image 100 to the waveguide 1100. The display module 1300 may project light constituting the virtual image 100 generated by the processor 1500 (FIG. 2) to the waveguide 1100 through the emission surface. In an embodiment of the disclosure, the display module 1300 may function as a projector.

The display module 1300 may include a light source and an image panel. The light source is an optical component that emits light, and may generate light by adjusting an RGB color. The light source may be configured as, for example, an LED. The image panel may be configured as a reflective image panel that modulates light emitted by the light source into light containing a two-dimensional image, and reflects the light. The reflective image panel may be, for example, a DMD panel, an LCoS panel, or another known reflective image panel.

The gaze tracking sensor 1400 may obtain an eye image by capturing an image of reflected light that is reflected from the user's eye. In an embodiment of the disclosure, the gaze tracking sensor 1400 may include at least one IR camera.

The AR device 1000 may identify the pupil and the iris from the eye image by performing image processing on the user's eye image captured by the gaze tracking sensor 1400. In an embodiment of the disclosure, the AR device 1000 may also detect the pupil and the iris from the eye image by using a pre-trained deep neural network model. The deep neural network model may include at least one of, for example, a CNN, an RNN, an RBM, a DBN, a BRDNN, or deep Q-networks, but is not limited thereto.

The AR device 1000 may measure a size of a region corresponding to the identified pupil, and determine the light transmittance of the light transmission unit 1200 and/or the brightness of the light constituting the virtual image 100 based on the measured pupil size. The pupil size may be changed by pupillary reflex. A change in the pupil size means that the pupil size increases or decreases to adjust an amount of light incident on the eye. The pupil size and brightness of the light incident on the eye have a non-linear relationship, and as the brightness of the light increases, the pupil size decreases. When the pupil size is enlarged, it means that the brightness of the light is low, and it may be preferred to increase the brightness of the light constituting the virtual image 100. When the pupil size is reduced, it means that the brightness of the light is high, and in this case, it may be preferred to darken the virtual image by decreasing the brightness of the light constituting the virtual image 100.

In an embodiment of the disclosure, the AR device 1000 may adjust or change the brightness of the light constituting the virtual image 100 according to a relationship to be inversely proportional to the measured pupil size. The AR device 1000 may adjust or change the brightness of the light constituting the virtual image 100 by an amount that is inversely proportional to the measured pupil size. For example, the AR device 1000 may decrease the brightness of the virtual image 100 as the pupil size is greater, and may increase the brightness of the virtual image 100 as the pupil size is smaller.

In an embodiment of the disclosure, the AR device 1000 may adjust or change the light transmittance according to a relationship to be proportional to the measured pupil size. For example, the AR device 1000 may increase the light transmittance of the light transmission unit 1200 as the pupil size is greater, and decrease the light transmittance of the light transmission unit 1200 as the pupil size is smaller.

The AR device 1000 may change the light transmittance of the light transmission unit 1200 and/or the brightness of the light of the virtual image 100 in consideration of other factors as well as the pupil size. In an embodiment of the disclosure, the AR device 1000 may also adjust the light transmittance and/or the brightness of the light of the virtual image 100 based on a distance between a position of a gaze point according to the user's gaze direction obtained through the gaze tracking sensor 1400 and a position at which the virtual image 100 is displayed. In another embodiment, the AR device 1000 may adjust the light transmittance and/or the brightness of the light of the virtual image 100 based on an external illuminance measured through the illuminance sensor 1810 (FIG. 2).

In another embodiment of the disclosure, the AR device 1000 may perform calibration on a light transmittance and a brightness value of a virtual image for which the user feels comfort, and may also adjust the light transmittance and/or the brightness of the light of the virtual image 100 based on a result value of the calibration.

The AR device 1000 may change the light transmittance or the light transmission unit 1200 and the brightness of the display module 1300 according to the adjusted or changed light transmittance and brightness of the light of the virtual image 100.

In an embodiment of the disclosure, the AR device 1000 may change the light transmittance by changing a value of a supply voltage applied to the light transmission unit 1200. The AR device 1000 may control the light transmittance of the light transmission unit 1200 to be changed in a range of about 5% to about 95%. Visibility of the virtual image 100 displayed on the waveguide 1100 may be changed according to the light transmittance changed by the light transmission unit 1200.

In an embodiment of the disclosure, the AR device 1000 may change a brightness value of the display module 1300 by changing a value of a supply voltage applied to the display module 1300.

A technology for adjusting brightness of a display according to an illuminance of a surrounding environment is required for the AR device 1000 to improve the visibility of the virtual image 100. When the brightness of the display is extremely high compared to the illuminance of the surrounding environment, the visibility of the virtual image 100 may decrease, and glare or eye fatigue may occur. Also, when the brightness of the display is increased for a long time in a high-illuminance environment, power consumption may increase, and overheating of a device may occur. When the illuminance of the surrounding environment is low, a light transmittance of external light is increased, which increases visibility of the real world object 200, but there is a problem in that the virtual image 100 does not appear relatively bright.

In the case of the technology of the related art, the light transmittance of the light transmission unit 1200 is determined or adjusted based on the illuminance of the surrounding environment, and thus, the visibility of the virtual image 100 displayed on the waveguide 1100 deteriorates, or problems such as power consumption and overheating of a battery occur.

The pupil size and brightness of light incident on the eye have a non-linear relationship, and as the brightness of the light increases, the pupil size decreases. Also, recently, a machine learning technique for predicting a visually comfortable eye state through a change in the pupil size has been studied.

The AR device 1000 according to an embodiment of the disclosure may determine the light transmittance of the light transmission unit 1200 and/or the brightness of the display module 1300 based on information on the pupil size obtained through the gaze tracking sensor 1400. The AR device 1000 of the disclosure may simultaneously adjust a light transmittance of external light through the light transmission unit 1200 and the brightness of the light of the virtual image 100, and thus may reduce a decrease in a contrast ratio between the virtual image 100 and the real world object 200, thereby providing optimal visibility and reducing power consumption. Therefore, a user using the AR device 1000 of the disclosure feels reduced glare or eye fatigue even in dark or bright places, and thus may use AR content for a long time.

Figure 7:
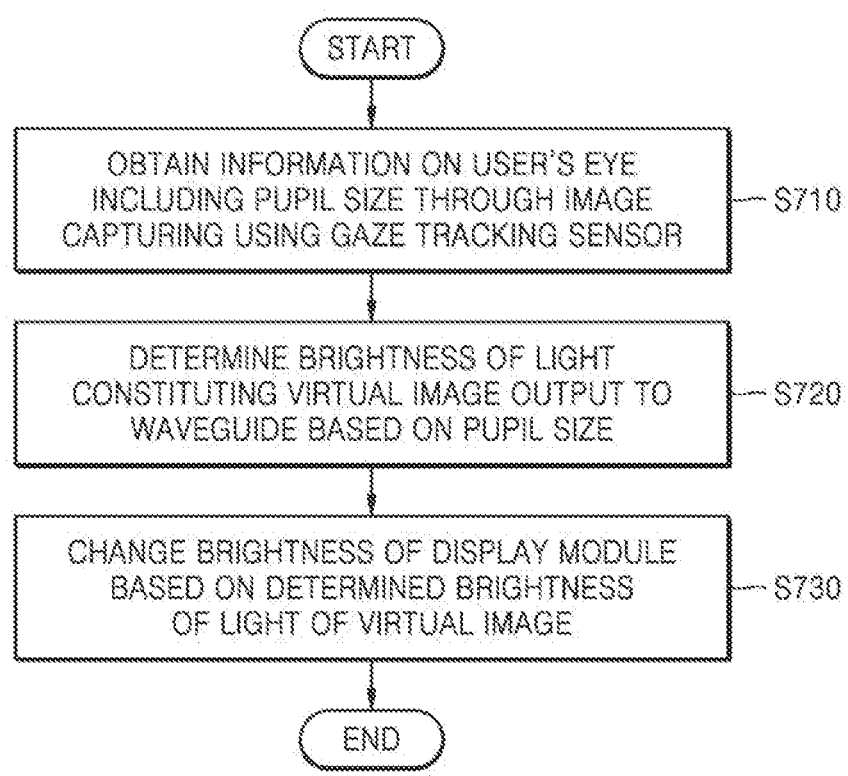
FIG. 7 is a flowchart of an operating method of an AR device, according to an embodiment.

FIG. 7 is a flowchart of an operating method of an AR device, according to an embodiment.

In operation S710, the AR device 1000 obtains information on a user's eye through image capturing using a gaze tracking sensor, the information including a pupil size. In an embodiment of the disclosure, the AR device 1000 may capture an eye image by using the gaze tracking sensor and measure the user's pupil size from the captured eye image. In an embodiment of the disclosure, the AR device 1000 may obtain the eye image by irradiating infrared rays to the cornea of the user's eye by using an infrared irradiator and capturing an image of reflected light that is reflected from the cornea by using a gaze tracking camera.

The AR device 1000 may identify a pupil and an iris from the eye image by performing image processing on the user's eye image captured by using the gaze tracking sensor. In an embodiment of the disclosure, the AR device 1000 may also detect the pupil and the iris from the eye image by using a pre-trained deep neural network model. In this case, the 'pre-trained deep neural network model' is an artificial intelligence model which includes a plurality of layers and is trained by performing supervised learning that applies a plurality of pre-obtained eye images as inputs and applies label values respectively corresponding to the pupil, the iris, and the cornea as outputs. The plurality of layers may have weights and bias values through learning. The pre-trained deep neural network model may be, for example, a CNN model. However, the disclosure is not limited thereto, and the deep neural network model may include at least one of, for example, an RNN model, an RBM, a DBN, a BRDNN, or deep Q-networks.

The AR device 1000 may measure a size of a region corresponding to the identified pupil. In an embodiment of the disclosure, the AR device 1000 may obtain information on the pupil size in real time by measuring the pupil size at a preset unit time interval. For example, when a unit time is 10 seconds, the AR device 1000 may periodically measure the pupil size at an interval of 10 seconds.

In operation S720, the AR device 1000 determines a brightness of light constituting a virtual image output to a waveguide based on the measured pupil size. The pupil size and brightness of light incident on the eye have a non-linear relationship, and as the brightness of the light increases, the pupil size decreases. When the pupil size is enlarged, it means that the brightness of the light is low, and it may be preferred to increase the brightness of the light constituting the virtual image. When the pupil size is reduced, it means that the brightness of the light is high, and in this case, it may be preferred to darken the virtual image by decreasing the brightness of the light constituting the virtual image. In an embodiment of the disclosure, the AR device 1000 may adjust or change the brightness of the light constituting the virtual image in inverse proportion to the pupil size. For example, the AR device 1000 may decrease the brightness of the light constituting the virtual image as the pupil size is greater, and may increase the brightness of the light consisting the virtual image as the pupil size is smaller.

In operation S730, the AR device 1000 changes brightness of a display module based on the determined brightness of the light of the virtual image. In an embodiment of the disclosure, the AR device 1000 may change the brightness of the display module according to a brightness value of the light of the virtual image output to the waveguide by adjusting a value of a current applied to the display module.

Figure 8:
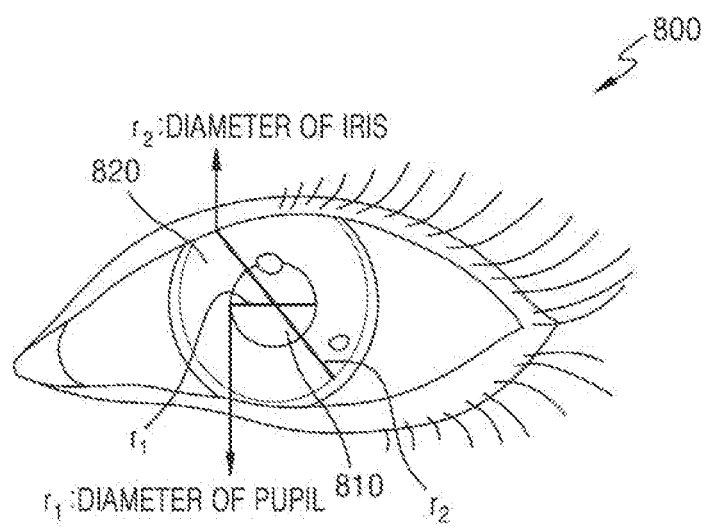
FIG. 8 is a diagram for describing a method used by an AR device to calculate a pupil ratio from an image of a user's eye, according to an embodiment.

FIG. 8 is a diagram for describing a method used by an AR device to calculate a pupil ratio from an image of a user's eye, according to an embodiment.

Referring to FIG. 8, the AR device 1000 may capture an image of the user's eye by using the gaze tracking sensor 1400 (FIG. 2) and obtain an eye image 800. The AR device 1000 may detect regions of a pupil 810 and an iris 820 from the eye image 800.

The processor 1500 (FIG. 2) of the AR device 1000 may identify the pupil 810 and the iris 820 from the eye image 800 by using an image processing method. In an embodiment of the disclosure, the processor 1500 may detect, as the pupil 810, a region having the lowest pixel brightness and a circular shape among regions included in the eye image 800 by performing image processing on the eye image 800 obtained from the gaze tracking sensor 1400. In an embodiment of the disclosure, the processor 1500 may obtain information on a size of the pupil 810 by measuring a diameter of the region detected as the pupil 810. In the same manner, the processor 1500 may detect a region of the iris 820 and obtain information on a size of the iris 820.

In another embodiment of the disclosure, the processor 1500 may also identify the pupil 810 and the iris 820 from the eye image 800 by using a pre-trained deep neural network model. The 'pre-trained deep neural network model' may be an artificial intelligence model trained through supervised learning using a plurality of pre-obtained images of a pupil and an iris as inputs and label values of the pupil and the iris as ground truths. The deep neural network model may be, for example, a CNN model. However, the disclosure is not limited thereto, and the deep neural network model may be a known artificial intelligence model including at least one of an RNN model, an RBM, a DBN, a BRDNN, or deep Q-networks.

The processor 1500 may measure a size of a diameter of a region corresponding to each of the pupil 810 and the iris 820. The processor 1500 may calculate a pupil size ratio R by performing an operation of dividing a measured size of a diameter $r_2$ of the pupil 810 by a size of a diameter $r_1$ of the iris 820.

In an embodiment of the disclosure, the processor 1500 may compare the calculated pupil size ratio R with a reference pupil size ratio, and change brightness of light constituting a virtual image based on a result of the comparing. The 'reference pupil size ratio' is a pupil size ratio that serves as a reference to determine the brightness of the light constituting the virtual image, and may be determined from the pupil size according to brightness of the virtual image in a state in which the user feels comfort. In an embodiment of the disclosure, a reference pupil size may be determined based on an average value of pupil sizes according to brightness of a virtual image, which is preferred by a plurality of users in a comfortable state, according to data previously obtained through an experiment. In an embodiment of the disclosure, the reference pupil size may be determined based on at least one of an age of a specific user, a preference for brightness of a virtual image according to identification information, or a type of an application being executed on the AR device 1000.

In an embodiment of the disclosure, the processor 1500 may perform a calibration process in which the user feels comfort or which allows to set a preferred state by differently setting the brightness of the light constituting the virtual image projected to the waveguide 1100 (FIG. 2) to display the virtual image on the display module. The processor 1500 may measure a pupil size of the user under conditions for the brightness of the light of the virtual image, which are determined according to a result of the calibration process, and may also determine the measured pupil size as the reference pupil size.

The processor 1500 may compare a pupil size ratio calculated from the eye image 800 with the reference pupil size ratio and determine the brightness of the light of the virtual image based on a result of the comparing. In an embodiment of the disclosure, the processor 1500 may adjust or change the brightness of the light constituting the virtual image in inverse proportion to the pupil size ratio. For example, the processor 1500 may decrease the brightness of the light constituting the virtual image as the pupil size ratio is greater than the reference pupil size ratio, and may increase the brightness of the light constituting the virtual image as the pupil size ratio is smaller than the reference pupil size ratio.

Figure 9:
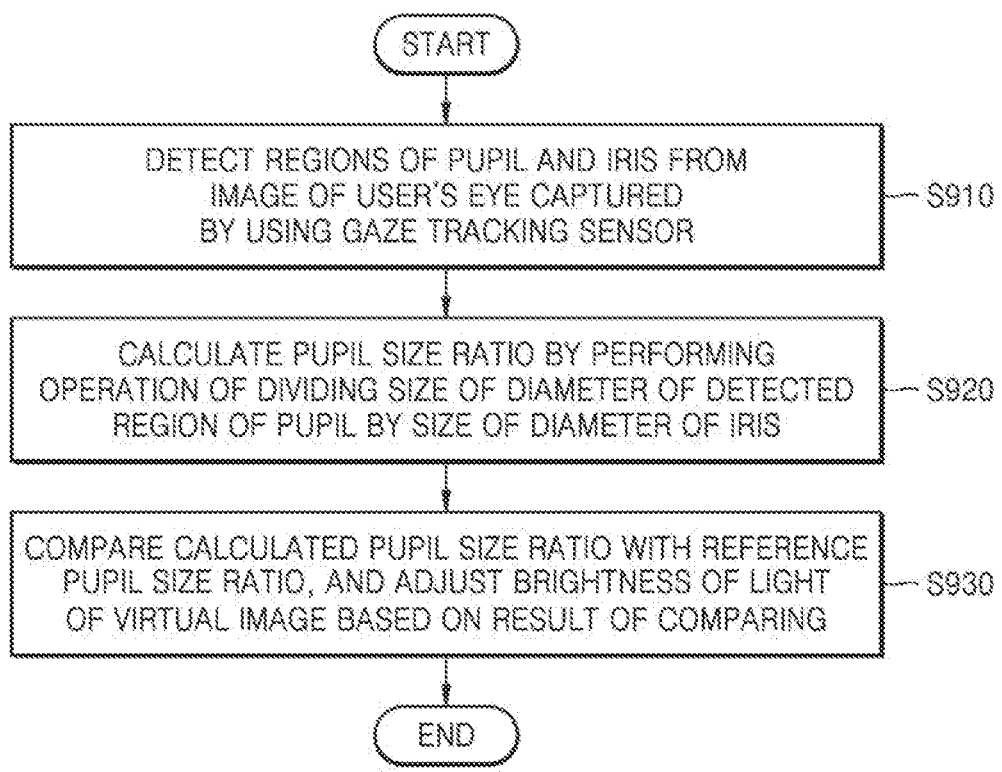
FIG. 9 is a flowchart of an operating method of an AR device, according to an embodiment.

FIG. 9 is a flowchart of an operating method of an AR device, according to an embodiment.

In operation S910, the AR device 1000 detects regions of a pupil and an iris from an image of a user's eye captured by using the gaze tracking sensor. In an embodiment of the disclosure, the AR device 1000 may obtain an eye image by capturing the image of the user's eye by using the gaze tracking sensor. In an embodiment of the disclosure, the AR device 1000 may detect the pupil and the iris from the eye image by using a known image processing method. A specific method in which the AR device 1000 detects the pupil and the iris from the eye image through image processing is the same as that described with reference to FIG. 8, and thus, redundant descriptions thereof are omitted.

In another embodiment of the disclosure, the AR device 1000 may detect the pupil and the iris from the eye image by using a pre-trained deep neural network model.

In operation S920, the AR device 1000 calculates a pupil size ratio by performing an operation of dividing a size of a diameter of the detected pupil by a size of a diameter of the iris.

In operation S930, the AR device 1000 compares the calculated pupil size ratio with a reference pupil size ratio and adjusts brightness of light constituting a virtual image based on a result of the comparing. The 'reference pupil size ratio' is the same as that described with reference to FIG. 8, and thus, redundant descriptions are omitted. The AR device 1000 may adjust or change the brightness of the light constituting the virtual image according to a relationship to be inversely proportional to the calculated pupil size ratio. For example, the AR device 1000 may decrease the brightness of the light constituting the virtual image as the pupil size ratio is greater than the reference pupil size ratio, and may increase the brightness of the light constituting the virtual image as the pupil size ratio is smaller than the reference pupil size ratio.

Figure 10:
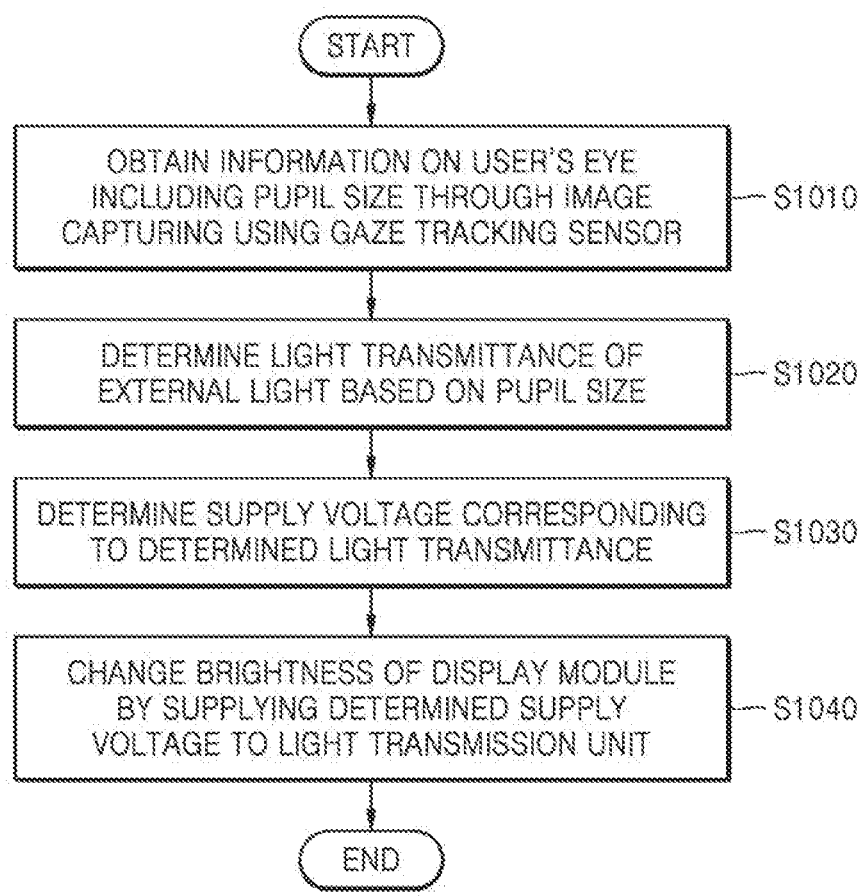
FIG. 10 is a flowchart of an operating method of an AR device, according to an embodiment.

FIG. 10 is a flowchart of an operating method of an AR device, according to an embodiment.

In operation S1010, the AR device 1000 obtains information on a user's eye through image capturing using the gaze tracking sensor, the information including a pupil size. In an embodiment of the disclosure, the AR device 1000 may capture an eye image by using the gaze tracking sensor and measure the user's pupil size from the captured eye image. A specific method in which the AR device 1000 measures the pupil size from the eye image is the same as operation S710 illustrated in FIG. 7, and thus, redundant descriptions thereof are omitted.

In operation S1020, the AR device 1000 determines a light transmittance of external light based on the pupil size. The light transmittance may refer to a ratio of an amount of transmitted light to an amount of incident light incident on the AR device 1000. When the light transmittance is increased, the amount of light incident through the light transmission unit 1200 (FIGS. 1B and 2) of the AR device 1000 from the outside increases, and accordingly, brightness of a real world object viewed by the user increases. In contrast, when the light transmittance is decreased, the amount of light incident through the light transmission unit 1200 from the outside decreases, and accordingly, the brightness of the real world object viewed by the user decreases. The pupil size changes based on the amount of light. A change in the pupil size is caused by pupillary reflex and means that the pupil size increases or decreases to adjust an amount of light incident on the eye. The pupil size and brightness of light incident on the eye have a non-linear relationship, and as the brightness of the light increases, the pupil size decreases. When the pupil size is enlarged, it means that the brightness of the light is low, and it may be preferred to increase a light transmittance of light incident on the AR device 1000 from the outside. When the pupil size is reduced, it means that the brightness of the light is high, and in this case, it may be preferred to darken the virtual image by decreasing the light transmittance of the light incident on the AR device 1000 from the outside.

In an embodiment of the disclosure, the AR device 1000 may adjust the light transmittance according to a relationship to be proportional to the pupil size. For example, the light transmittance may be increased as the pupil size is greater, and the light transmittance may be decreased as the pupil size is smaller.

In an embodiment of the disclosure, the AR device 1000 may detect regions of a pupil and an iris from the eye image, and calculate a pupil size ratio through an operation of dividing a diameter of the detected region of the pupil by a diameter of the region of the iris. The AR device 1000 may compare the calculated pupil size ratio with a reference pupil size ratio, and may adjust or change the light transmittance based on a result of the comparing. For example, the AR device 1000 may increase the light transmittance as the pupil size ratio is greater than the reference pupil size ratio, and decrease the light transmittance as the pupil size ratio is smaller than the reference pupil size ratio.

In operation S1030, the AR device 1000 determines a supply voltage corresponding to the determined light transmittance. In an embodiment of the disclosure, the processor 1500 (FIG. 2) of the AR device 1000 may create a relationship between supply voltage values and the light transmittance in the form of a LUT and store the LUT in the storage 1900 (FIG. 2). For example, in the LUT, it may be stored that when the light transmittance is 100%, a supply voltage having a value of −1.85 V is applied, when the light transmittance is 50%, a supply voltage having a value of −0.55 V is applied, and when the light transmittance is 10%, a supply voltage having a value of 0.45 V is applied. However, this is merely an example, and the disclosure is not limited to the aforementioned voltage values. The processor 1500 may obtain information on the supply voltage values according to the light transmittance from the LUT by accessing the storage 1900, and may determine a supply voltage value corresponding to the light transmittance.

In operation S1040, the AR device 1000 changes a light transmittance of the light transmission unit 1200 (FIG. 2) by supplying the determined supply voltage to the light transmission unit 1200. The processor 1500 of the AR device 1000 may control the light transmission unit 1200 so that the determined supply voltage corresponding to the light transmittance is supplied to the light transmission unit 1200. Brightness of a view of a real scene may be changed in response to the changed light transmittance of the light transmission unit 1200. For example, when the light transmittance is increased, a real world object in the real scene may appear bright, and when the light transmittance is decreased, the real world object may appear dark.

Due to the change in the light transmittance, a user of the AR device 1000 may view the real world object of which brightness is changed and a virtual image together. Due to the change or adjustment of the light transmittance, the user may be provided with improved visibility through a high contrast ratio between the real world object and the virtual image.

Figure 11:
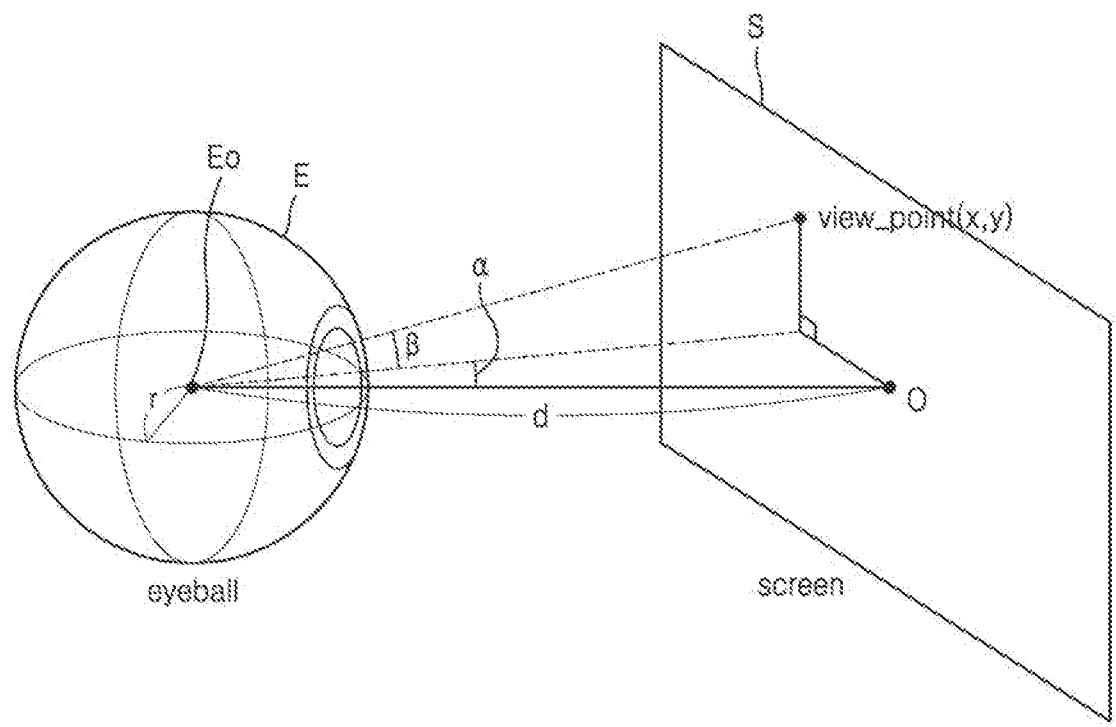
FIGS. 11, 12 and 13 are diagrams for describing a method used by an AR device to calculate a gaze point from information on a gaze direction measured by a gaze tracking sensor, according to an embodiment.
Figure 12:
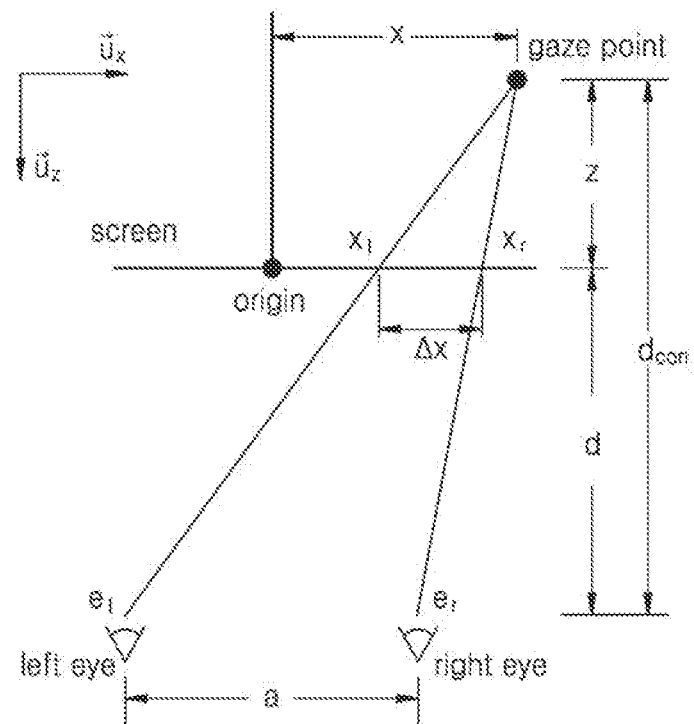
Figure 13:
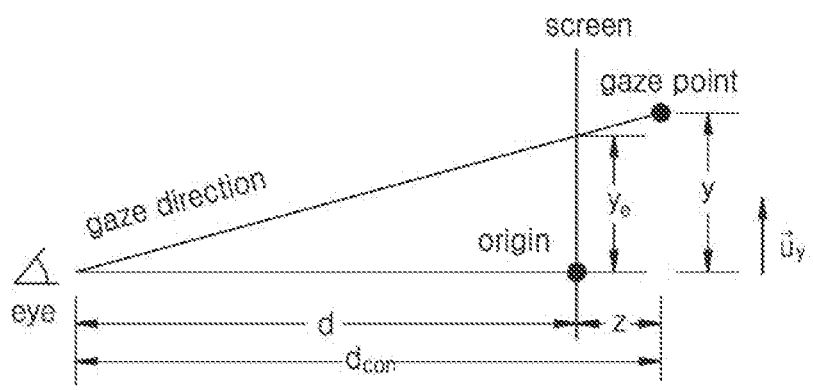

FIGS. 11, 12 and 13 are diagrams for describing a method used by an AR device to calculate a gaze point from information on a gaze direction measured by a gaze tracking sensor, according to an embodiment.

FIG. 11 illustrates a 3D eye model for a user's gaze direction.

Referring to FIG. 11, tracking of the gaze direction according to an embodiment of the disclosure may be performed based on a 3D eye model for a gaze. In the 3D eye model for the gaze, when it is assumed that an eyeball has a perfect spherical shape and the eyeball rotates in an ideal space according to the gaze, the gaze may be mathematically modeled as illustrated in the following equation.

$$x = d \cdot \tan\alpha; \quad y = d \cdot \sec\alpha \cdot \tan\beta \tag{3}$$

$$\beta = \sin^{-1}\frac{\Delta y}{r}; \quad \alpha = \sin^{-1}\frac{\Delta x}{r\cos\beta} \tag{4}$$

In Equation (3), d denotes a distance between a center $E_o$ of a user's eye and a virtual screen S, α denotes an angle at which the user's eye rotates in an x-axis (a horizontal axis) direction based on a case in which the user's eye directly gazes at the virtual screen S, and β denotes an angle at which the user's eye rotates in a y-axis (a vertical axis) direction based on a case in which the user's eye directly gazes at the virtual screen S. Also, in Equation (4), r denotes a radius of a sphere when it is assumed that the user's eye has a spherical shape.

The gaze tracking sensor 1400 (FIG. 2) according to an embodiment of the disclosure may measure rotational degrees (e.g., α and β) of the user's eye E, and the AR device 1000 may calculate two-dimensional position coordinates values (x, y) of a gaze direction of the user's eye E on the virtual screen S by using the rotational degrees (α and β) of the user's eye E. The rotational degrees (α and β) of the user's eye E may be understood as gaze angle information in horizontal and vertical directions of the eye E.

An actual eye movement is not an ideal 3D rotational movement. In particular, the relaxation/contraction of eye muscles greatly generates a gaze in left and right directions, so that an error may occur during estimation of a gaze in a vertical direction with respect to the gaze in the left and right directions based on an ideal 3D rotational eye model. Due to the error, the AR device 1000 causes the user to gaze at a random point, compares a gaze direction value estimated through the gaze tracking sensor 1400 with an actual gaze direction value for the point, and statistically processes the gaze direction values, and thus, accuracy may be improved.

FIG. 12 illustrates a relationship between a gaze point and gaze angles from left and right eyes.

FIG. 13 illustrates a relationship between a gaze point and a gaze angle in an upward gaze direction.

Referring to FIGS. 12 and 13, a focal distance may be estimated through a difference in gaze directions (or gaze coordinates) of both eyes obtained through the gaze tracking sensor 1400 (FIG. 2). When a focal distance to the gaze point is calculated, gaze axes of both eyes may not meet each other. In this case, assuming that both eyes are at the same height, coordinates of a vertical axis (a y-axis) may be calculated as an average of coordinates of the vertical axis (the y-axis) of both eyes. For example, a distance between both eyes may be assumed to be 7 cm. The following equation may be obtained by using a proportional expression through the geometrical assumption described above.

$$\frac{-z}{\Delta x} = \frac{d-z}{a} \tag{5}$$

In Equation (5) above, a distance d between both eyes of the user and a virtual screen and a distance a between the eyes are required. The distance d may be obtained by measuring a rotation angle of an eyeball by using a gaze image that the user gazes at in front of him or her. As a result, a convergence distance $d_{con}$, which is a distance to the gaze point, is given by the following equation. z denotes a distance between the virtual screen and the gaze point.

$$d_{con} = d + z = d + \frac{\Delta x d}{\Delta x - a} = \left(1 + \frac{\Delta x}{\Delta x - a}\right) \cdot d \tag{6}$$

In Equation (6) above, Δx is an interval in a horizontal direction of gaze coordinates of both eyes on the virtual screen S (FIG. 11), and may be obtained through each gaze angle of the user's left and right eyes, as illustrated in Equations 3 and 4 above.

Figure 14A:
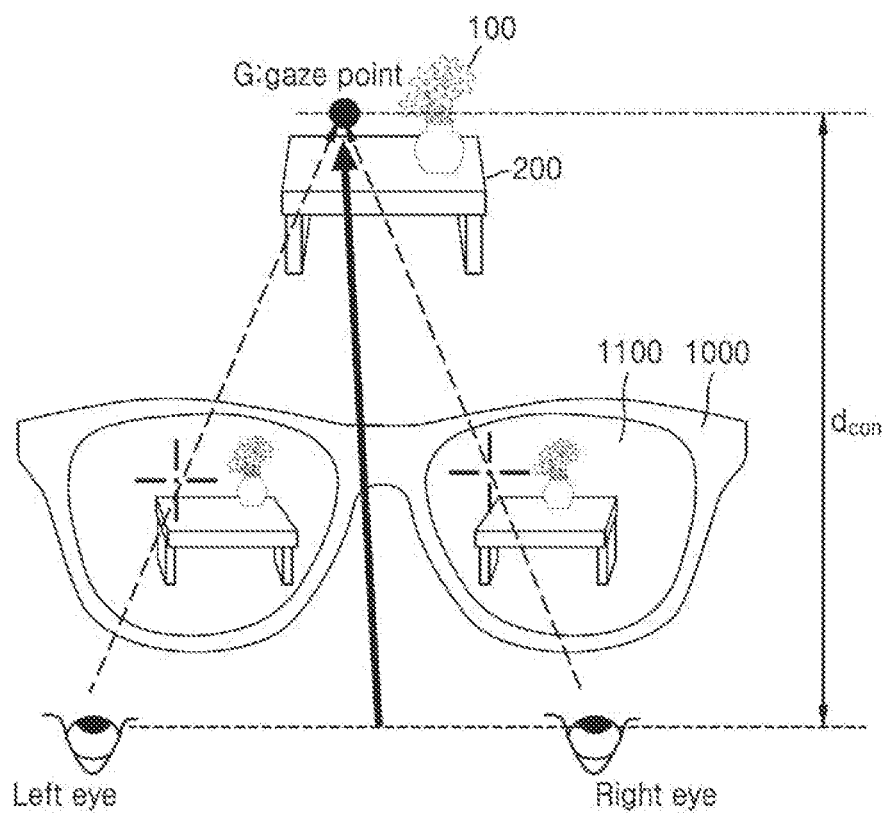
FIG. 14A is a diagram for describing a method used by an AR device to change a brightness of light constituting a virtual image based on a distance between a gaze point and the virtual image, according to an embodiment.

FIG. 14A is a diagram for describing a method used by an AR device to change a brightness of light constituting a virtual image based on a distance between a gaze point and the virtual image, according to an embodiment.

Referring to FIG. 14A, the AR device 1000 may obtain information on a gaze direction of a user's left eye and information on a gaze direction of the user's right eye through the gaze tracking sensor 1400 (FIG. 2), and may obtain 3D position coordinate values for a gaze point G at which the gaze direction of the left eye and the gaze direction of the right eye converge. A specific method in which the gaze tracking sensor 1400 obtains information on the user's gaze direction is the same as that described with reference to FIGS. 5A and 5B, and thus, redundant descriptions thereof are omitted. As in the embodiments described with reference to FIGS. 11 to 13, the processor 1500 (FIG. 2) of the AR device 1000 may calculate and obtain information on the gaze point G from the information on the gaze direction of the user's left eye and the information on the gaze direction of the user's right eye. The 'gaze point G' may refer to a point at which the gaze direction of the left eye and the gaze direction of the right eye converge according to binocular disparity.

In an embodiment of the disclosure, the processor 1500 may calculate a convergence distance $d_{con}$, which is a distance between both eyes of the user and the gaze point G, based on the 3D position coordinate values of the gaze point G, and may measure a distance between the gaze point G and the virtual image 100 displayed at a position having a depth equal to the convergence distance $d_{con}$. The virtual image 100 output to the waveguide 1100 may appear to be focused on a position having a depth value equal to the convergence distance $d_{con}$ from both eyes of the user according to the binocular disparity. That is, the AR device 1000 may set a depth in a range equal or similar to a depth (a convergence distance) from both eyes of the user to the gaze point G as a focal distance of the virtual image 100. In this case, a depth in a similar range may refer to not only when the focal distance of the virtual image 100 is equal to the depth from both eyes of the user to the gaze point G, but also includes a depth within a range that may be naturally recognized by the user. In the embodiment illustrated in FIG. 14A, the user may view the real world object 200 and the virtual image 100, which are arranged on the gaze point G, together via the AR device 1000.

The processor 1500 of the AR device 1000 may measure a distance between the 3D position coordinate values of the gaze point G and the virtual image 100 displayed at a position spaced apart by a depth corresponding to the convergence distance $d_{con}$, and may change or adjust brightness of light constituting the virtual image 100 based on the measured distance. This will be described in detail with reference to FIG. 14B.

Figure 14B:
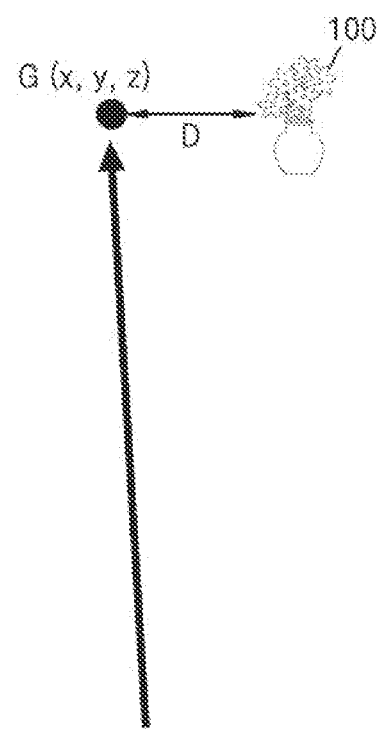
FIG. 14B is a diagram for describing a method used by an AR device to change a brightness of light constituting a virtual image based on a distance between a gaze point and the virtual image, according to an embodiment.

FIG. 14B is a diagram for describing a method used by an AR device to change a brightness of light constituting a virtual image based on a distance between a gaze point and the virtual image, according to an embodiment.

Referring to FIG. 14B, the AR device 1000 may measure a distance D between the gaze point G and the virtual image 100 displayed at a positioned spaced apart by the convergence distance $d_{con}$ (FIG. 14A) from both eyes of the user. In an embodiment of the disclosure, the processor 1500 (FIG. 2) of the AR device 1000 may measure a distance D between 3D position coordinate values (x, y, z) of the gaze point G and a 3D model of a virtual object constituting the virtual image 100. The 3D model of the virtual object is a mathematical modeling for rendering a virtual 3D object in a virtual 3D space, and for example, a mesh model or a bounding volume may be used. The mesh model may be a model that has a triangular shape with vertices and represents a surface of a virtual object. The bounding volume may be a 3D volume model in the form of a box, a cylinder, or a sphere surrounding a virtual object.

The AR device 1000 may change or adjust the brightness of the light constituting the virtual image 100 based on the distance D between the gaze point G and the virtual image 100. The processor 1500 may change or adjust the brightness of the light constituting the virtual image 100 according to a relationship to be inversely proportional to the distance D between the gaze point G and the virtual image 100. For example, the brightness of the light of the virtual image 100 may be decreased as the distance D between the gaze point G and the virtual image 100 is longer, and the brightness of the light of the virtual image 100 may be increased as the distance D between the gaze point G and the virtual image 100 is shorter.

Figure 15:
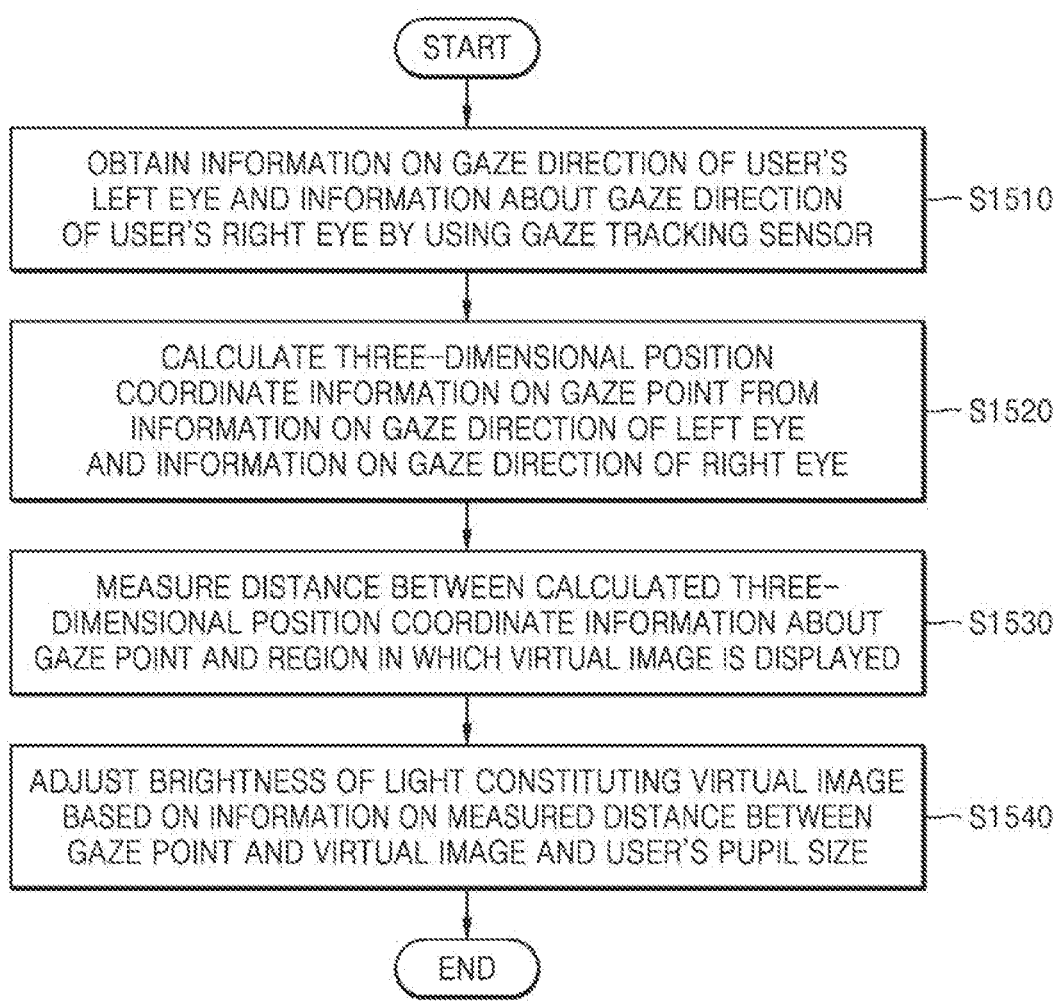
FIG. 15 is a flowchart of a method used by an AR device to change a brightness of light constituting a virtual image based on a distance between a gaze point and the virtual image, according to an embodiment.

FIG. 15 is a flowchart of a method used by an AR device to change a brightness of light constituting a virtual image based on a distance between a gaze point and the virtual image, according to an embodiment.

In operation S1510, the AR device 1000 obtains information on a gaze direction of a user's left eye and information on a gaze direction of the user's right eye by using the gaze tracking sensor.

In operation S1520, the AR device 1000 calculates 3D position coordinate information on a gaze point from the information on the gaze direction of the left eye and the information on the gaze direction of the right eye. The gaze point may refer to a point at which the gaze direction of the left eye and the gaze direction of the right eye converge according to binocular disparity. A method in which the AR device 1000 obtains position information on the gaze point from the information on the gaze directions of the left and right eyes is the same as that described with reference to FIGS. 11 to 13, and thus, redundant descriptions thereof are omitted.

In operation S1530, the AR device 1000 measures a distance between the calculated 3D position coordinate information on the gaze point and a region in which a virtual image is displayed. In an embodiment of the disclosure, the AR device 1000 may calculate a convergence distance, which is a distance between both eyes of the user and the gaze point, based on 3D position coordinate values of the gaze point, and may measure a distance between the gaze point and the virtual image displayed at a position having a depth equal to the convergence distance. In an embodiment of the disclosure, the AR device 1000 may set a depth in a range equal or similar to a depth (a convergence distance) from both eyes of the user to the gaze point as a focal distance of the virtual image. The AR device 1000 may measure a distance between the virtual image displayed at the focal distance and the gaze point.

The AR device 1000 may measure a distance between the gaze point and the virtual image by measuring a distance between the 3D position coordinate values of the gaze point and a 3D model of a virtual object constituting the virtual image. In an embodiment of the disclosure, the AR device 1000 may measure the distance between the gaze point and the virtual image by using a 3D collision model.

In operation 1540, the AR device 1000 adjusts brightness of light constituting the virtual image based on information on the measured distance between the gaze point and the virtual image and a pupil size of the user. In an embodiment of the disclosure, the AR device 1000 may change or adjust the brightness of the light constituting the virtual image according to a relationship to be inversely proportional to the pupil size and inversely proportional to the distance between the gaze point and the virtual image. For example, the brightness of the light of the virtual image may be decreased as the pupil size is greater and the distance between the gaze point and the virtual image is longer, and the brightness of the light of the virtual image may be increased as the pupil size is smaller and the distance between the gaze point and the virtual image is shorter.

When the user views the virtual image 100 via the AR device 1000, the user's gaze is focused on the virtual image 100, so that the brightness of the light constituting the virtual image 100 should be increased to improve the visibility of the virtual image 100. In contrast, when the user views the real world object 200 instead of the virtual image 100 via the AR device 1000, that is, when the gaze point G is positioned on the real world object 200 instead of the virtual image 100, the brightness of the light of the virtual image 100 should be decreased to make a real world object more visible. The AR device 1000 according to the embodiments illustrated in FIGS. 14A, 14B, and 15 changes or adjusts the brightness of the light constituting the virtual image 100 based on the distance D between the virtual image 100 and the gaze point G according to the user's gaze direction as well as the pupil size, and thus, the visibility of the virtual image 100 may be adaptively improved according to the user's gaze direction, and a decrease in a contrast ratio between the real world object 200 and the virtual image 100 may be reduced. Also, the AR device 1000 of the disclosure adaptively adjusts the brightness of the light constituting the virtual image 100, and thus, when the user does not gaze at the virtual image 100, current consumption may be reduced, and accordingly, a battery duration may be increased.

Figure 16A:
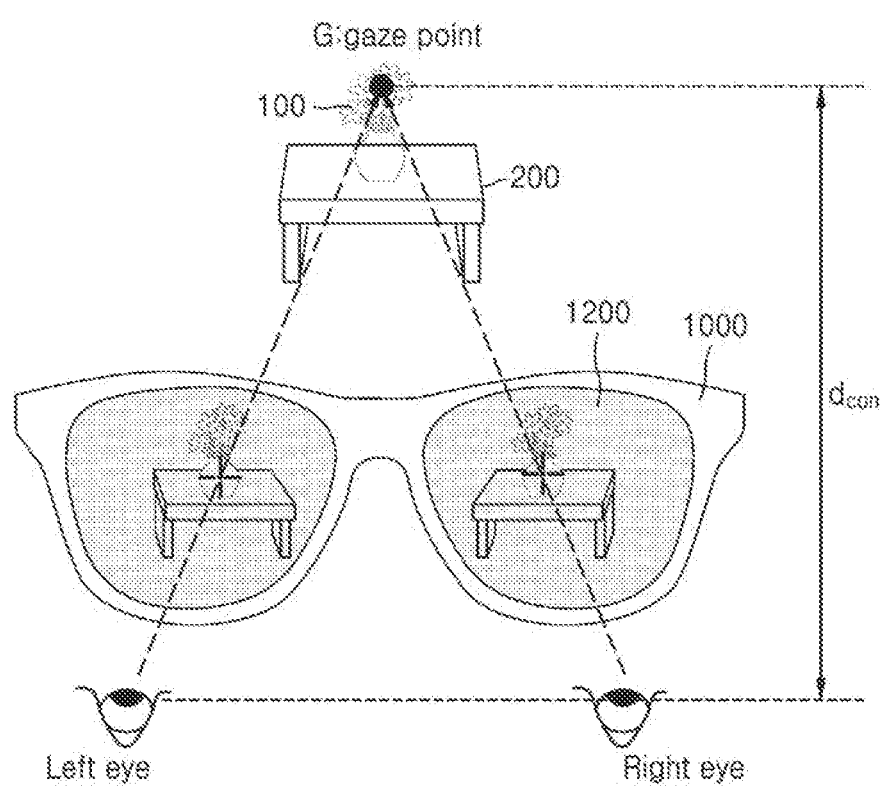
FIG. 16A is a diagram for describing a method used by an AR device to change a light transmittance of a light transmission unit based on a distance between a gaze point and a virtual image, according to an embodiment.

FIG. 16A is a diagram for describing a method used by an AR device to change a light transmittance of a light transmission unit based on a distance between a gaze point and a virtual image, according to an embodiment.

Figure 16B:
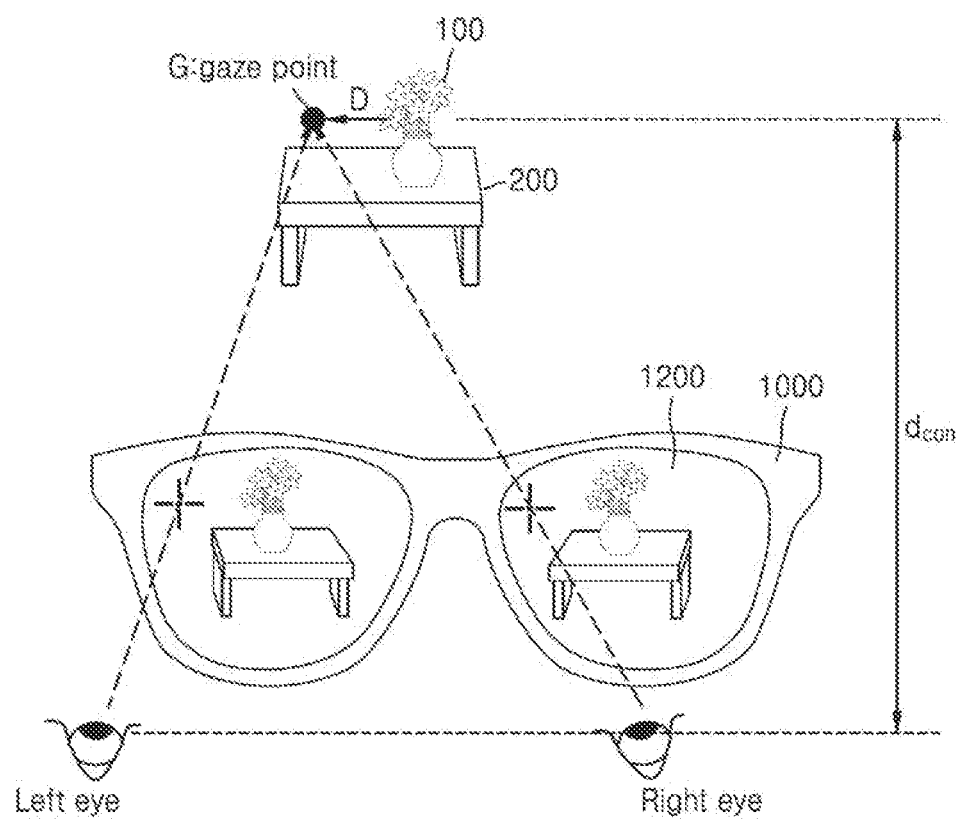
FIG. 16B is a diagram for describing a method used by an AR device to change a light transmittance of a light transmission unit based on a distance between a gaze point and a virtual image, according to an embodiment.

FIG. 16B is a diagram for describing a method used by an AR device to change a light transmittance of a light transmission unit based on a distance between a gaze point and a virtual image, according to an embodiment.

Referring to FIG. 16A, the AR device 1000 may obtain information on a gaze direction of a user's left eye and information on a gaze direction of the user's right eye through the gaze tracking sensor 1400 (FIG. 2), and may obtain 3D position coordinate values for a gaze point G at which the gaze direction of the left eye and the gaze direction of the right eye converge. The AR device 1000 may calculate a convergence distance $d_{con}$, which is a distance between both eyes of the user and the gaze point G, based on the 3D position coordinate values of the gaze point G, and may measure a distance between the gaze point G and the virtual image 100 displayed at a position having a depth equal to the convergence distance $d_{con}$. A specific method in which the AR device 1000 obtains the 3D position coordinate values of the gaze point G and measures the distance between the gaze point G and the virtual image 100 is the same as that described with reference to FIG. 14A, and thus, redundant descriptions thereof are omitted.

The AR device 1000 may change a light transmittance of the light transmission unit 1200 based on the distance between the gaze point G and the virtual image 100. In an embodiment of the disclosure, the processor 1500 (FIG. 2) of the AR device 1000 may change or adjust the light transmittance of the light transmission unit 1200 according to a relationship to be proportional to the measured distance between the gaze point G and the virtual image 100. When the light transmittance is increased by the light transmission unit 1200, an amount of light incident through the light transmission unit 1200 from the outside increases, and accordingly, brightness of a real world object viewed by the user increases. In contrast, when the light transmission unit 1200 is decreased by the light transmission unit 1200, the amount of the light incident through the light transmission unit 1200 from the outside decreases, and accordingly, the brightness of the real world object viewed by the user decreases.

The AR device 1000 may decrease the light transmittance of the light transmission unit 1200 as the distance between the gaze point G and the virtual image 100 is shorter. In the embodiment illustrated in FIG. 16A, when the gaze point G according to gaze directions of both eyes of the user is positioned on the virtual image 100, that is, when the user views the virtual image 100 focusing on the virtual image 100, the AR device 1000 may decrease the light transmittance of the light transmission unit 1200. Because the light transmittance is decreased, external light does not pass through the light transmission unit 1200, so that a real world object 200 in a real scene appears dark.

In a case opposite to the aforementioned case, that is, when the distance between the gaze point G and the virtual image 100 is long, the AR device 1000 may increase the light transmittance of the light transmission unit 1200. Referring to FIG. 16B, as a distance D between the gaze point G and the virtual image 100 is longer, the AR device 1000 may increase the light transmittance of the light transmission unit 1200. In the embodiment illustrated in FIG. 16B, the user views the real world object 200 focusing on the real world object 200, not the virtual image 100, and in this case, the AR device 1000 may increase the light transmittance of the light transmission unit 1200. Because the light transmittance is increased, an amount of external light passing through the light transmission unit 1200 increases, so that the real world object 200 in the real scene appears bright.

Figure 17:
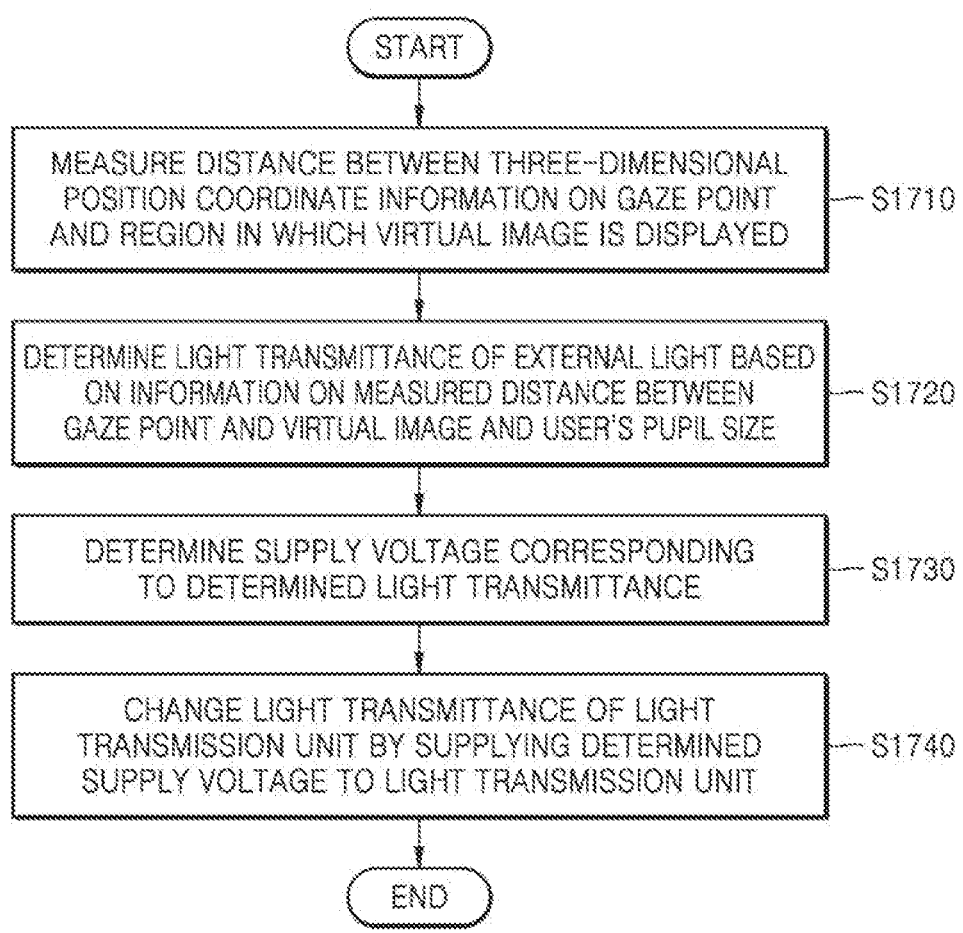
FIG. 17 is a flowchart of an operating method of an AR device, according to an embodiment.

FIG. 17 is a flowchart of an operating method of an AR device, according to an embodiment.

In operation S1710, the AR device 1000 measures a distance between 3D position coordinate information on a gaze point G (FIGS. 16A and 16B) and a region in which a virtual image is displayed. In an embodiment of the disclosure, the AR device 1000 may obtain information on a gaze direction of a user's left eye and information on a gaze direction of the user's right eye through the gaze tracking sensor 1400 (FIG. 2), and may obtain 3D position coordinate values for the gaze point G at which the gaze direction of the left eye and the gaze direction of the right eye converge. The AR device 1000 may calculate a convergence distance $d_{con}$ (FIGS. 16A and 16B), which is a distance between both eyes of the user and the gaze point G, based on the 3D position coordinate values of the gaze point G, and may measure a distance between the gaze point G and the virtual image displayed at a position having a depth equal to the convergence distance $d_{con}$.

In operation S1720, the AR device 1000 determines a light transmittance of external light based on information on the measured distance between the gaze point G and the virtual image and a pupil size of the user. In an embodiment of the disclosure, the AR device 1000 may change or adjust a light transmittance of light incident from the outside according to a relationship to be proportional to the distance between the gaze point G and the virtual image. For example, the AR device 1000 may decrease a light transmittance of the light transmission unit 1200 (FIG. 2) as the distance between the gaze point G and the virtual image is shorter. As an example opposite to the aforementioned case, the AR device 1000 may increase the light transmittance of the light transmission unit 1200 as the distance between the gaze point G and the virtual image is longer.

The AR device 1000 may change or adjust the light transmittance of the light transmission unit 1200 based on the pupil size as well as the distance between the gaze point G and the virtual image. In an embodiment of the disclosure, the AR device 1000 may change or adjust the light transmittance in proportion to the pupil size. A specific embodiment in which the AR device 1000 changes or adjusts the light transmittance of the light transmission unit 1200 based on the pupil size is the same as described with reference to FIG. 10, and thus, redundant descriptions thereof are omitted.

In operation S1730, the AR device 1000 determines a supply voltage corresponding to the determined light transmittance.

In operation S1740, the AR device 1000 changes the light transmittance of the light transmission unit 1200 by supplying the determined supply voltage to the light transmission unit 1200. Operations S1730 and S1740 are respectively the same operations S1030 and S1040 illustrated in FIG. 10, and thus, redundant descriptions thereof are omitted.

When the user views the virtual image 100 (FIGS. 16A and 16B) via the AR device 1000, the user's gaze is focused on the virtual image 100, so that the visibility of the virtual image 100 needs to be improved by decreasing the light transmittance and processing the real world object 200 (FIGS. 16A and 16B) in the real scene to be relatively darker than the virtual image 100. In contrast, when an object that the user gazes via the AR device 1000 is the real world object 200 instead of the virtual image 100, it may be preferred to increase the brightness of the real world object 200 by increasing the light transmittance to make the real world object 200 viewed by the user more visible. The AR device 1000 according to the embodiments illustrated in FIGS. 16A, 16B, and 17 changes or adjusts the light transmittance of the light transmission unit 1200 (FIG. 2) based on the distance D between the virtual image 100 and the gaze point G according to the user's gaze direction as well as the pupil size, and thus, the visibility of the virtual image 100 may be adaptively improved according to the user's gaze direction, and a decrease in the contrast ratio between the real world object 200 and the virtual image 100 may be reduced.

The AR device 1000 as described in the disclosure may be implemented in hardware, software, and/or a combination of hardware and software. For example, the AR device 1000 as described in the embodiments of the disclosure may be implemented with one or more general purpose computers or special purpose computers such as a processor, an arithmetic logic unit (ALU), an application specific integrated circuit (ASIC), a digital signal processor (DSP), a digital signal processing device (DSPD), a programmable logic device (PLD), a microcomputer, a microprocessor, or any device capable of executing and responding to instructions.

The software may include a computer program, codes, instructions, or one or more combinations of them, and may configure a processing device to operate as desired or instruct the processing device independently or collectively.

The software may be implemented as a computer program including instructions stored in a computer-readable storage medium. Examples of the computer-readable storage medium include a magnetic storage medium (e.g., a ROM, a floppy disk, a hard disk, etc.), and an optical recording medium (e.g., a compact disc ROM (CD-ROM), or a digital versatile disc (DVD)). The computer-readable storage medium can also be distributed over network coupled computer systems so that the computer-readable code is stored and executed in a distributed fashion. The medium may be read by the computer, stored in the memory, and executed by the processor.

The computer may be a device capable of calling the stored instructions from the storage medium and operating according to the embodiments disclosed herein, based on the called instructions, and may include the AR device 1000 according to the embodiments of the disclosure.

The computer-readable storage medium may be provided in the form of a non-transitory storage medium. In this case, "non-transitory" means that the storage medium does not include a signal and is tangible but does not distinguish that data is semi-permanently or temporarily stored in the storage medium.

Furthermore, the AR device 1000 or the operating method thereof, according to the embodiments of the disclosure, may be included and provided in a computer program product. The computer program product may be traded between a seller and a buyer as a commodity.

The computer program product may include a software program, a computer-readable storage medium in which the software program is stored. For example, the computer program product may include a product (e.g., a downloadable application) in the form of a software program electronically distributed through a manufacturer of the AR device 1000 or an electronic market (e.g., Google Play Store™ or App Store™). For electronic distribution, at least a portion of a software program may be stored in a storage medium or may be temporarily generated. In this case, the storage medium may be a storage medium of a server of a manufacturer, a server of an electronic market, or a relay server temporarily storing a software program.

In a system including a server and a terminal (e.g., an AR device), the computer program product may include a storage medium of the server or a storage medium of the terminal. Alternatively, when there is a third device (e.g., a smartphone) communicatively connected to the server or the terminal, the computer program product may include a storage medium of the third device. In another example, the computer program product may be transmitted from the server to the terminal or the third device, or may include a software program itself that is transmitted from the third device to the terminal.

In this case, one of the server, the terminal, and the third device may execute the computer program product to perform the method according to the embodiments of the disclosure. Alternatively, two or more of the server, the terminal, and the third device may execute the computer program product to perform the method according to the embodiments of the disclosure in a distributed fashion.

For example, the server (e.g., a cloud server or an artificial intelligence (AI) server) may execute the computer program product stored therein to control the terminal communicatively connected to the server to perform the method according to the embodiments of the disclosure.

In another example, the third device may execute the computer program product to control the terminal communicatively connected to the third device to perform the method according to the embodiments of the disclosure.

In the case that the third device executes the computer program product, the third device may download the computer program product and execute the downloaded computer program product. Alternatively, the third device may execute a computer program product provided in a pre-loaded state to execute the method according to the disclosed embodiments of the disclosure.

Although the embodiments of the disclosure are described above, the disclosure is not limited to the aforementioned embodiments, but may be practiced in various modifications without departing from the scope of the disclosure claimed as in the appended claims, and the modifications should not be understood separately from technical ideas or prospects of the disclosure.

As described above, although the embodiments have been described with reference to the limited embodiments and drawings, various modifications and variations may be made from the above description by those skilled in the art. For example, the aforementioned method may be performed in a different order, and/or the aforementioned electronic devices, structures, circuits, etc., may be combined in different combinations from what is described above, and/or replaced or substituted by other components or equivalents thereof, to obtain appropriate results.

What is claimed is:

1. An augmented reality (AR) device, comprising:
a display module configured to output light of a virtual image;
a waveguide transmitting the output light of the virtual image to an eye of a user and passing external light therethrough;
a gaze tracking sensor configured to obtain an image of the eye of the user;
a memory storing instructions; and
a processor configured to execute the instructions to:
measure a pupil size of the eye of the user based on the image of the eye of the user obtained by the gaze tracking sensor,
calculate a pupil size ratio, the pupil size ratio being a ratio of a diameter of the measured pupil size to a diameter of an iris of the eye of the user; and
control the display module to adjust a brightness of the light of the virtual image based on a result of a comparison of the calculated pupil size ratio with a reference pupil size ratio.

2. The AR device of claim 1, wherein the processor is further configured to execute the instructions to adjust the brightness of the light of the virtual image by an amount that is inversely proportional to the pupil size.

3. The AR device of claim 1, wherein the processor is further configured to execute the instructions to:
detect the iris of the eye of the user from the image of the eye of the user captured by the gaze tracking sensor, and
calculate the pupil size ratio by performing an operation of dividing the diameter of the measured pupil size by the diameter of the iris.

4. The AR device of claim 3, wherein the reference pupil size ratio is determined as an average value of pupil sizes based on user comfort according to data previously obtained.

5. The AR device of claim 3, wherein the reference pupil size ratio is determined based on at least one of an age of the user, a brightness preference for the virtual image according to identification information, a type of an application being executed on the AR device, or information on a calibration performed by the user.

6. The AR device of claim 1, wherein the processor is further configured to execute the instructions to:
obtain, by using the gaze tracking sensor, three-dimensional position coordinate information on a gaze point at which a gaze direction of a left eye and a gaze direction of a right eye converge,
obtain distance information on a distance between the gaze point and the virtual image by measuring a distance between the three-dimensional position coordinate information on the gaze point and a region in which the virtual image is displayed, and
change the brightness of the light of the virtual image based on the pupil size and the distance information on the distance between the gaze point and the virtual image.

7. The AR device of claim 6, wherein the gaze tracking sensor comprises a first gaze tracking camera configured to track the gaze direction of the left eye by capturing an image of the left eye of the user, and a second gaze tracking camera configured to track the gaze direction of the right eye by capturing an image of the right eye of the user, and
wherein the processor is further configured to execute the instructions to:
obtain a first gaze vector indicating the gaze direction of the left eye by using the first gaze tracking camera,
obtain a second gaze vector indicating the gaze direction of the right eye by using the second gaze tracking camera,
detect a gaze point at which the first gaze vector and the second gaze vector converge according to binocular disparity, and
obtain three-dimensional position coordinate information on the detected gaze point.

8. The AR device of claim 6, wherein the processor is further configured to execute the instructions to adjust the brightness of the light of the virtual image by an amount that is inversely proportional to the distance between the gaze point and the virtual image.

9. The AR device of claim 1, further comprising:
a light transmission unit configured to adjust a light transmittance of the external light; and
a power supply configured to supply power to the light transmission unit,
wherein the processor is further configured to execute the instructions to:
determine the light transmittance of the external light based on the pupil size,
determine a supply voltage corresponding to the light transmittance, and
adjust the light transmittance of the external light by controlling the power supply to supply the determined supply voltage to the light transmission unit.

10. The AR device of claim 9, wherein the processor is further configured to execute the instructions to:
obtain, by using the gaze tracking sensor, three-dimensional position coordinate information on a gaze point at which a gaze direction of a left eye and a gaze direction of a right eye converge,
obtain distance information on a distance between the gaze point and the virtual image by measuring a distance between the three-dimensional position coordinate information on the gaze point and a region in which the virtual image is displayed, and
control the light transmission unit to adjust the light transmittance of the external light based on the pupil size and the distance information.

11. A method of an augmented reality (AR) device, the method comprising:
obtaining an image of an eye of a user by a gaze tracking sensor;
measuring a pupil size of the eye of the user based on the image of the eye of the user obtained by the gaze tracking sensor;
calculating a pupil size ratio, the pupil size ratio being a ratio of a diameter of the measured pupil size to a diameter of an iris of the eye of the user; and
adjusting a brightness of a display module of the AR device based on a result of a comparison of the calculated pupil size ratio with a reference pupil size ratio.

12. The method of claim 11, further comprising determining a brightness of light of a virtual image output to a waveguide of the AR device based on the measured pupil size,
wherein the determining of the brightness of the light of the virtual image comprises adjusting the brightness of the light of the virtual image by an amount that is inversely proportional to the measured pupil size.

13. The method of claim 11, further comprising:
detecting the iris of the eye of the user from the image of the eye of the user captured by the gaze tracking sensor; and
wherein calculating the pupil size ratio comprises dividing the diameter of the measured pupil size by the diameter of the iris.

14. The method of claim 13, wherein the reference pupil size ratio is determined as an average value of pupil sizes based on user comfort, according to data previously obtained.

15. The method of claim 13, wherein the reference pupil size ratio is determined based on at least one of an age of the user, a brightness preference for the virtual image according to identification information, a type of an application being executed on the AR device, or information on calibration performed by the user.

16. The method of claim 11, further comprising:
determining a brightness of light of a virtual image output to a waveguide of the AR device based on the measured pupil size;
obtaining, by using the gaze tracking sensor, three-dimensional position coordinate information on a gaze point at which a gaze direction of a left eye and a gaze direction of a right eye converge; and
obtaining distance information on a distance between the gaze point and the virtual image by measuring a distance between the three-dimensional position coordinate information on the gaze point and a region in which the virtual image is displayed,
wherein the adjusting of the brightness of the light of the virtual image comprises adjusting the brightness of the light of the virtual image based on the pupil size and the distance information on the distance between the gaze point and the virtual image.

17. The method of claim 16, wherein the obtaining of the three-dimensional position coordinate information on the gaze point comprises:
obtaining a first gaze vector by tracking the gaze direction of the left eye by using a first gaze tracking camera;
obtaining a second gaze vector by tracking the gaze direction of the right eye by using a second gaze tracking camera;
detecting a gaze point at which the first gaze vector and the second gaze vector converge according to binocular disparity; and
obtaining three-dimensional position coordinate information on the detected gaze point.

18. The method of claim 16, wherein the determining of the brightness of the light of the virtual image comprises adjusting the brightness of the light of the virtual image by an amount that is inversely proportional to the distance between the gaze point and the virtual image.

19. The method of claim 11, further comprising:
determining a light transmittance of external light based on the measured pupil size;
determining a supply voltage corresponding to the determined light transmittance; and
adjusting a light transmittance of the external light by supplying the determined supply voltage to a light transmission unit of the AR device.

20. A non-transitory computer-readable recording medium connected to at least one processor, the recording medium storing instructions that, when executed, cause the at least one processor to:
obtain an image of an eye of a user by a gaze tracking sensor;
measure a pupil size of the eye of the user based on the image of the eye of the user obtained by the gaze tracking sensor;
calculate a pupil size ratio, the pupil size ratio being a ratio of a diameter of the measured pupil size to a diameter of an iris of the eye of the user; and
adjust a brightness of a display module of an augmented reality (AR) device based on a result of a comparison of the calculated pupil size ratio with a reference pupil size ratio.

* * * * *